(12) United States Patent
Guzik et al.

(10) Patent No.: US 8,077,426 B2
(45) Date of Patent: Dec. 13, 2011

(54) MAGNETIC DISK CENTERING METHOD AND SYSTEM

(75) Inventors: Nahum Guzik, Palo Alto, CA (US); Sergey Korepanov, Los Altos, CA (US); Alexander Varlakhanov, San Carlos, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 0 days.

(21) Appl. No.: 12/638,545

(22) Filed: Dec. 15, 2009

(65) Prior Publication Data

US 2011/0141608 A1   Jun. 16, 2011

Related U.S. Application Data

(60) Provisional application No. 61/201,940, filed on Dec. 16, 2008.

(51) Int. Cl.
*G11B 21/02* (2006.01)
*G11B 5/58* (2006.01)

(52) U.S. Cl. ........... 360/75; 360/31; 360/70; 360/77.01; 360/77.02; 360/78.04; 360/99.08

(58) Field of Classification Search .................. None
See application file for complete search history.

(56) References Cited

U.S. PATENT DOCUMENTS

| | | | | | |
|---|---|---|---|---|---|
| 4,138,741 | A | * | 2/1979 | Hedlund et al. | 369/44.26 |
| 5,254,946 | A | * | 10/1993 | Guzik | 324/262 |
| 5,905,705 | A | * | 5/1999 | Takeda et al. | 360/51 |
| 6,421,199 | B1 | * | 7/2002 | McKenzie et al. | 360/77.04 |
| 6,496,322 | B1 | * | 12/2002 | Hasegawa et al. | 360/77.08 |
| 6,834,028 | B2 | * | 12/2004 | Itoh et al. | 369/30.17 |
| 6,971,154 | B2 | * | 12/2005 | Yoo et al. | 29/603.03 |
| 7,295,002 | B2 | * | 11/2007 | Guzik et al. | 324/212 |
| 7,304,820 | B2 | * | 12/2007 | Kato et al. | 360/99.08 |
| 7,450,339 | B2 | * | 11/2008 | Hirano et al. | 360/97.03 |
| 7,757,377 | B2 | * | 7/2010 | Ruden et al. | 29/603.03 |
| 7,791,831 | B2 | * | 9/2010 | McGlennen et al. | 360/70 |
| 2003/0112552 | A1 | * | 6/2003 | Choo et al. | 360/99.12 |
| 2008/0218896 | A1 | * | 9/2008 | Takaishi et al. | 360/77.02 |

* cited by examiner

*Primary Examiner* — Dismery Mercedes
(74) *Attorney, Agent, or Firm* — Pierce Atwood LLP; Joseph M. Maraia

(57) ABSTRACT

A system and method are described for aligning a data axis of one or more circular data-bearing tracks on an annular surface region of a magnetic media-bearing disk, with a spin axis of a spindle of a spinstand or a disk drive. The data axis is perpendicular to the surface region of the disk and the data tracks are concentric with respect to a data axis.

34 Claims, 18 Drawing Sheets

MAGNETIC DISK CENTERING METHOD AND SYSTEM

REFERENCE TO RELATED APPLICATION

This application claims priority to U.S. Provisional Application Ser. No. 61/201,940, filed Dec. 16, 2008. The contents of which are incorporated by reference in their entirety.

FIELD OF THE INVENTION

The present disclosure relates to magnetic recording, particularly to disk drives, magnetic head testers, and magnetic disk testers.

BACKGROUND OF THE INVENTION

A spinstand is a device for testing magnetic heads and magnetic medium-bearing disks for disk drives. A disk drive is a device having one or more magnetic medium-bearing disks installed on a spindle for rotation, and one or more magnetic heads flying over the surface of the disks reading data from and writing data onto those disks.

FIG. 1 shows a top plan view and a side view, partially cutaway, respectively, of a prior art spinstand 100. The spinstand 100 includes a base plate 102, a spindle assembly 104 including a rotor 110 and adapted for rotational motion about a spin axis 122. The spinstand further includes a rotary encoder 140 rigidly coupled to the rotor 110, stationary encoder reader 103, a chuck 112 supporting a disk 118, a precision head positioning mechanism 108 with attached X and Y linear position encoders 145 and 146 for absolute positioning of the head 116 over the disk, and a controller 105 for coordinating and controlling the functional operation of the device.

The spindle assembly 104 includes a rotor 110 (with an associated drive motor, not shown) mounted on the base plate 102.

The encoder 140 is rigidly coupled to the disk through rotor 110, and rotates about the spin axis of the spindle. The encoder 140 provides signals representative of the absolute angular position of the rotor 110 (and thus disk 118) at any given moment, during spinning of the disk or when the disk is stopped.

The precision head positioning mechanism 108 selectively positions a magnetic head 116, over the magnetic medium-bearing disk 118 supported by the chuck 112 of spindle assembly 104.

The precision head positioning mechanism 108 provides the absolute position of the head 116 in XY system of coordinates. The position of the spin axis 122 is also known in the same XY system of coordinates. The angular position of the disk 118 is determined by the rotary encoder 140 and therefore the location of any point on the disk 118 can be expressed in polar system of coordinates having the center of coordinate system at the spin axis 122. The location of that point of the disk 118 can also be converted to the XY system of coordinates, such that the position of the head in respect to that point on the disk can be determined at any given time.

Disk 118 is supported in a horizontal plane, clamped to a support surface S of spindle 104 by chuck 112. Disk 118 is clamped to spindle 104, for example by vacuum clamping (in the manner shown in U.S. Pat. No. 7,295,002). The spindle 104 is driven to rotate the disk 118 about spin axis 122 extending perpendicular to the plane of the disk 118.

There are several applications when a magnetic medium-bearing disk has pre-written or pre-printed data. In these applications the disk 118 includes a plurality of circular concentric data tracks on its magnetic medium-bearing surface, exemplified by track 124. When disk with pre-written or pre-printed data is placed on the spindle, the axis of concentricity of the data tracks (data axis) and axis of the spindle (spin axis 122) in general do not coincide due to mechanical tolerances. This creates a problem to follow the tracks. In such cases, particularly in disks with closely placed data tracks, the magnetic head positioning assembly of the spinstand might not be able to accommodate such offsets and perform the required testing functions with sufficient accuracy. Following of tracks in a presence of a large eccentricity makes it difficult and in some cases impossible because of unbearable load on the servo system used to position head 116 over the disk 118. It makes accurate measurements impossible in various applications.

An example of such an application is testing the disks where servo information is pre-printed using discrete track recording (DTR) technology.

In other applications, spinstands are used for data recovery and failure analysis, for example, when a disk with pre-written information is removed from a failed disk drive. For such an application, placing a removed disk on a spinstand, while providing minimal data track eccentricity with respect to the spin axis, is as important as in the case of testing Discrete Track Recording (DTR) disks. Data recovery and failure analysis are possible with higher degree of integrity if eccentricity is reduced.

Reducing eccentricity is beneficial for the disk drives as well. When DTR media with pre-printed servo information are assembled in a disk drive, it is important to mount the disk on a disk drive spindle with minimal data track eccentricity. Track following is possible with greater accuracy if eccentricity is reduced.

It is beneficial to reduce eccentricity by aligning the data axis of a disk with the spin axis of a spinstand or a drive.

Various devices are available in the prior art, which purport to center a disk using the inner diameter or outer diameter of the disk, e.g. as shown in U.S. Pat. No. 6,421,199. The method of that patent assumes that data tracks are essentially concentric to the outer edge of the disk, which is generally not true. This method provides accuracy couple of orders of magnitude lower than required.

The present invention provides a centering method and system for alignment of a data axis with a spin axis based on the information written on the disk, achieving a high degree of accuracy, on the order of several angstroms.

SUMMARY OF THE INVENTION

The invention provides a system and method for aligning a data axis of one or more circular data-bearing tracks on an annular surface region of a magnetic media-bearing disk, with a spin axis of a spindle of a spinstand or a disk drive, wherein the data axis is perpendicular to the surface region of the disk and the data tracks are concentric with respect to a data axis.

To perform the data axis alignment function, a data track centering assembly is included in a spinstand. An exemplary spinstand 100A is shown in FIG. 2. In a preferred form, the data track centering assembly includes two actuators 400 and 410 disposed from the opposite sides of a disk. The disk is mounted on the support surface of spindle of the spinstand. Each actuator has a contact element 404 and 414 respectively, and is adapted for selectively translating the contact element through at least a portion of a disk locus region, where disk locus region is defined as a spatial region extending from the disk-support surface in which a disk is placed in a spinstand, or located in a disk drive. Both contact elements are aligned and move along the same translation axis 460, where the translation axis intersects with and is perpendicular to the spin axis 122, so that the contact element can engage with the disk edge, apply force to the disk edge, and translate the disk. Each actuator can perform one of three functions with respect to disk 118 using its contact element—disk edge detection, disk edge position measurement, and disk translation.

In accordance with the invention, a disk 118 with pre-written information is mounted and clamped to the spindle 104. The precision head positioning mechanism 108 moves the head 116 over the disk 118; the head reads information written on the disk and determines eccentricity of the data tracks 315 relative to the spin axis 122. The eccentricity $\epsilon$ is measured based on the number of tracks crossed during one revolution, track pitch, and the angular position of the point corresponding to the maximum outwards eccentricity, that is, the farthest point (FP) on the disk representative of the relative position of a portion of the data track, which is farthest from the spin axis compared to all other points of the data track. The angular position $\alpha$ is determined by spindle encoder with respect to a once-per-revolution index signal generated by the spindle encoder 140. Preferably, the pre-written data includes embedded servo data.

Then, the disk is stopped and preferably locked in position where the data axis is aligned with the translation axis and faces the translating actuator. The point FP is aligned with the translation axis 460 and is between the spin axis and a first portion of the circumferential edge of the disk along the translation axis.

In the illustrated form of the invention, the actuator 400 performs a disk translation and actuator 410 performs a disk edge position detection using the respective contact elements 404 and 414. The position of the contact element 404 is determined by a linear position sensor comprised of a linear position encoder 480 attached to the contact element 404 and a linear position encoder reader 490 coupled to base 102. The position of the contact element 414 is determined by a linear position sensor comprised of a linear position encoder 484 attached to the contact element 414 and the linear position encoder reader 494 coupled to base 102.

The contact element 414 of the "detecting" actuator 410 is moved toward the edge of disk 118 at a relatively low speed to minimize impact when the contact element engages with the disk edge, such that the contact element does not cause a shift in position of the disk during edge position measurement. The advancement of the contact element 414 is stopped when it comes into the contact with the disk edge. The disk edge position is indicated and memorized when the reading of linear position reader 494 stops changing.

Then, the contact element 404 of the "translating" actuator 400 starts moving along the translation axis 460 toward the edge of the disk.

The controller 105 moves the "translating" contact element 404 using the position feedback from both the linear position encoder 480 attached to the "translating" contact element 404 and the linear position encoder 484 attached to the "detecting" contact element 414. The controller stops moving the "translating" contact element 404 when it determines that the "detecting" contact element 414 is moved by the required distance equal to the measured eccentricity.

The linear position encoder attached to the "detecting" contact element 414 reflects the disk position more accurately compared to the linear position encoder attached to the "translating" contact element 404, because the disk may be compressed by the "translating" contact element from the "translating" actuator side. The disk from the "detecting" actuator side is not compressed.

In a preferred form, the optional disk clamp assembly selectively clamps a magnetic media-bearing disk to the disk-support surface with a selectable clamp force. The clamp force is selected from force value FC1 for disk edge detection function and force value FC2 for disk translation function, wherein FC2 is different from FC1 (typically FC2 is smaller than FC1).

The translating actuator can apply force in two modes—in the first mode, translating actuator applies force to the edge of the disk mainly to overcome friction between the disk and the clamping mechanism selected to disk clamp force FC2; in the second mode, the translating actuator moves in the step movement to apply pulses of force, such that each pulse transfers kinetic energy of the contact element to the disk to move the disk.

When the "detecting" actuator indicates that the disk is translated by the required distance, the actuator contact elements 404 and 414 are both moved away from the disk edges.

As a final step, the disk 118 is clamped with the nominal clamp force FC1, driven to spin to a nominal rotational speed, the head 116 is loaded on disk 118, and the quality of centering is confirmed by reading servo information. In the case the servo information indicates that the residual eccentricity exceeds the prescribed threshold, the process is repeated iteratively.

In various embodiments, when two or more actuators are used, some actuators are dedicated to the disk edge position detection function and the other actuators are dedicated to the disk translation function.

In various embodiments, when two or more actuators are used, both actuators can perform both disk edge position detection function and the disk translation function.

In an alternative form of the invention, the track centering assembly includes a single actuator, which alternates its function between disk edge position measurement function and disk translation function.

BRIEF DESCRIPTION OF THE DRAWINGS

Various embodiments of the invention are disclosed in the following detailed description and the accompanying drawings.

DETAILED DESCRIPTION

The invention provides a method and system for aligning a data axis of one or more circular data-bearing tracks on an annular surface region of a magnetic media-bearing disk, with a spin axis of a spindle of a disk spin assembly (for example, of a spinstand or a disk drive), wherein the data axis is perpendicular to the surface region of the disk and the tracks are concentric with respect to a data axis. Preferably, the data includes servo data. In a preferred form, the system includes a disk spin assembly, a data track centering assembly, and a system controller.

The invention can be implemented in numerous ways, including as a process or method, an apparatus, a system, a computer readable medium such as a computer readable storage medium or a computer network wherein program instructions are sent over optical or electronic communication links, to effect the method of the invention. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
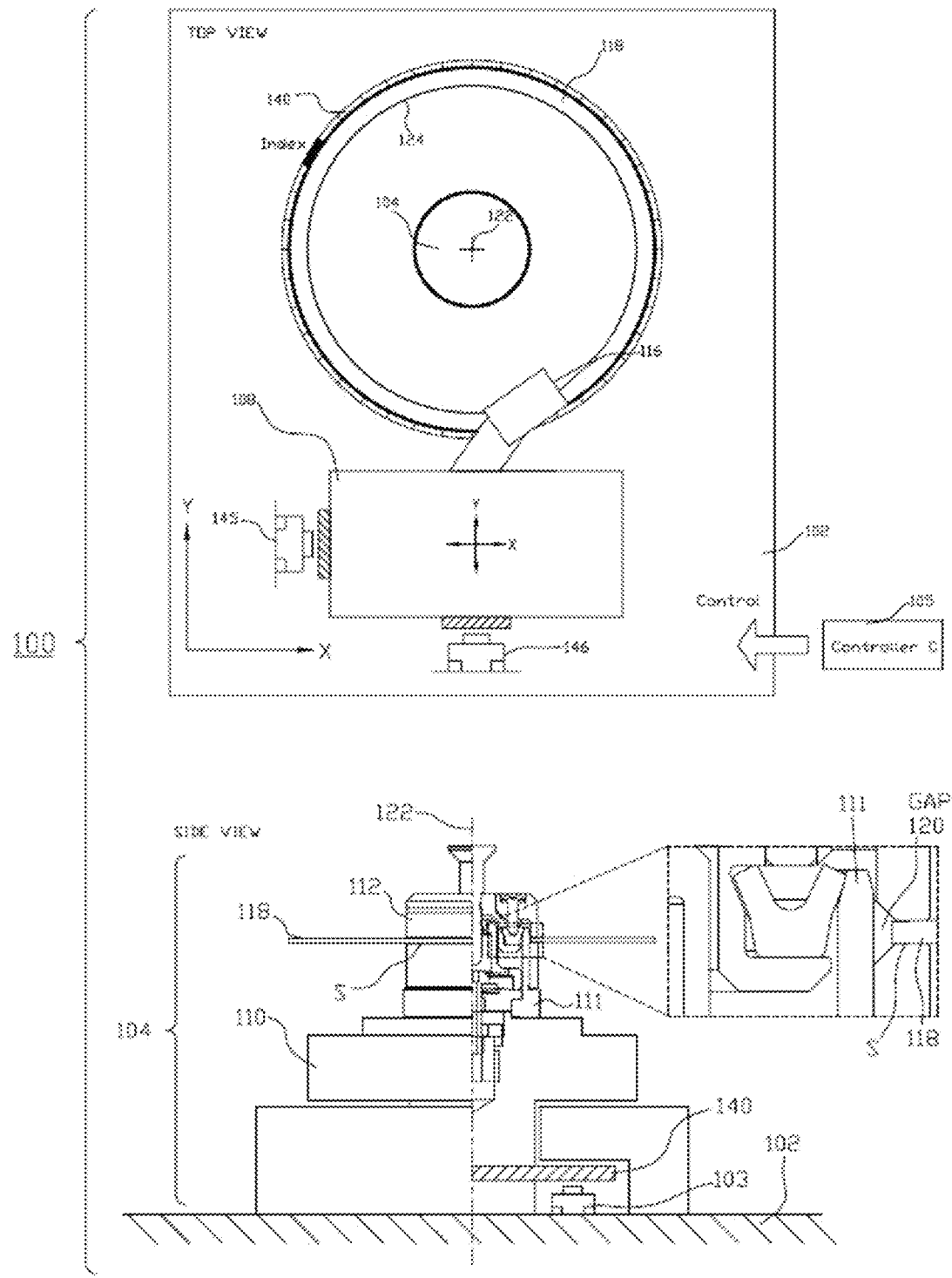
FIG. 1 is a top plan view and a side plan view, partially cutaway, schematic representation of a prior art magnetic head and disk tester, with a magnetic medium-bearing disk mounted on a spindle.
Figure 2:
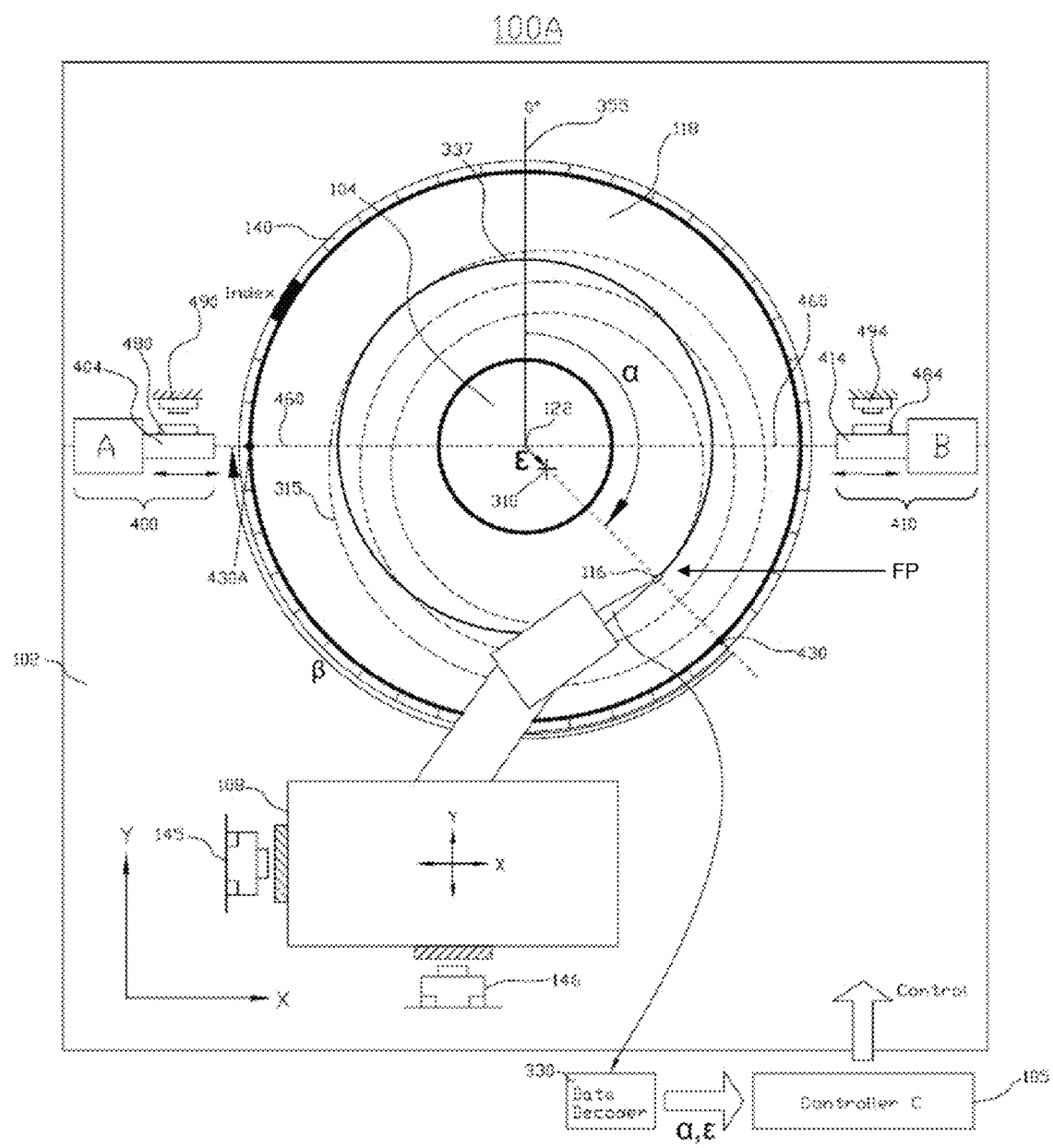
FIG. 2 is a top plan view schematic representation of a magnetic head and disk test system with two actuators in accordance with the invention.

An exemplary magnetic head and disk test system 100A in accordance with the invention is shown in FIG. 2. In FIG. 2, elements which correspond to elements in the prior art system of FIG. 1 are identified with the same reference numerals.

The spinstand of system 100A includes a disk spin assembly including a base plate 102, a spindle assembly 104 mounted on the base plate 102, a precision head positioning assembly 108, and a controller 105 for coordinating and controlling the functional operation of the system 100A.

The precision head positioning assembly 108 is adapted for selectively positioning a magnetic head 116, over a magnetic medium-bearing disk 118 supported by the spindle 104.

As shown in FIG. 1, disk 118 is supported in a horizontal plane, clamped to a support surface S of spindle 104, for example by vacuum clamping (in the manner shown in U.S. Pat. No. 7,295,002). In use, the spindle 104 is driven to rotate the disk 118 about a spin axis 122 extending perpendicular to the plane of the disk 118.

The outer diameter of the chuck centering bushing 111 is smaller than the inner diameter of the disk 118, such that the disk can be translated in respect to the bushing 111. The difference between two diameters shown as a gap 120 must be greater than the maximum amount of eccentricity (i.e. the maximum distance between the spin axis and the data axis).

When disk 118 with pre-written data exemplified by tracks 315 in FIG. 2 is placed on the spindle, data axis 310 and spin axis 122 do not coincide due to mechanical tolerances, i.e. tracks 315 are located eccentrically with respect to the spin axis 122.

Figure 3:
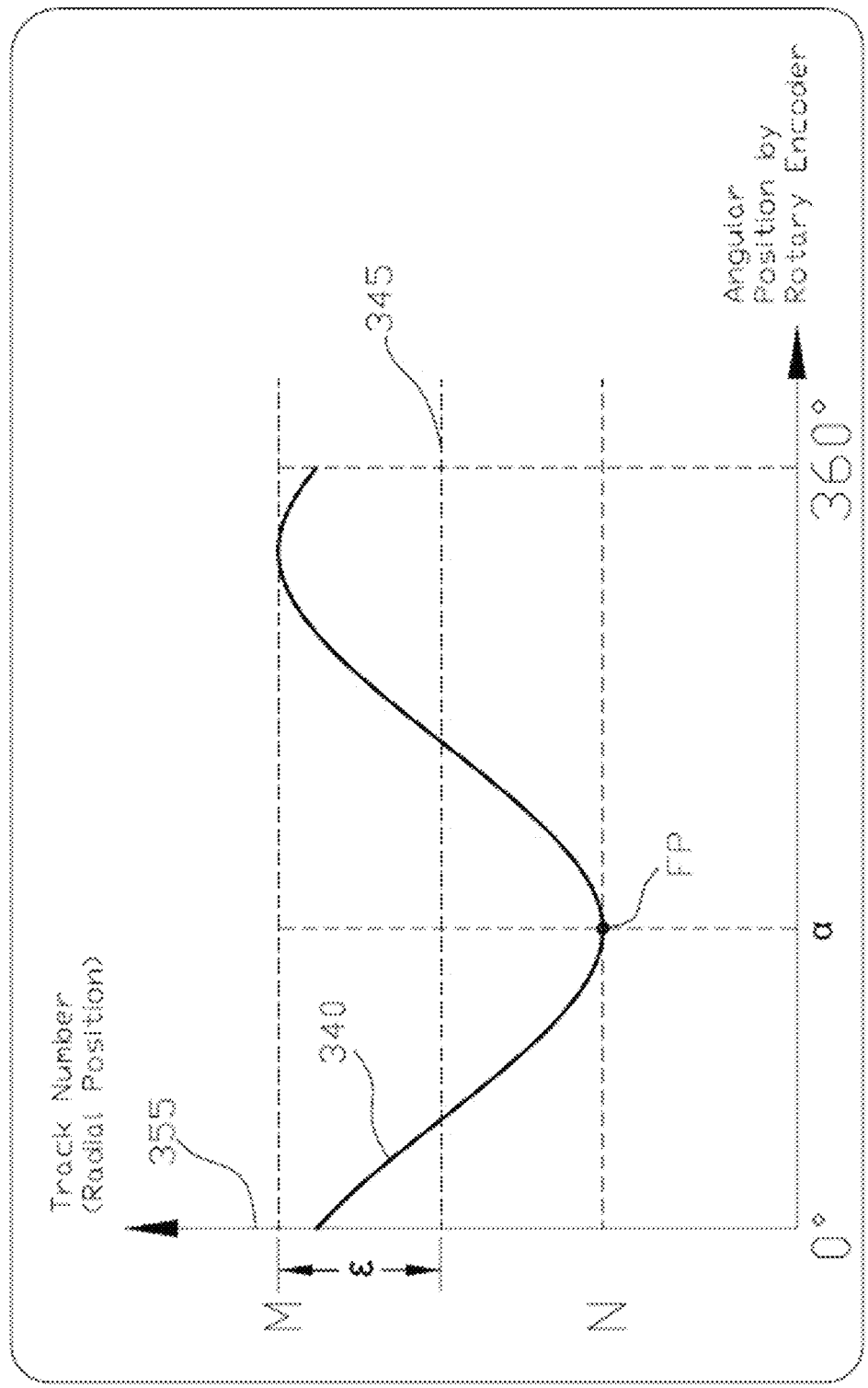
FIG. 3 is a schematic representation of the head trajectory over the eccentric tracks and the track numbers decoded by a servo decoder.

Because the tracks are located eccentrically, the head trajectory 337 (shown by solid line on FIG. 2) crosses multiple tracks of the disk. The track numbers can be decoded and the trajectory can be presented in polar coordinates as shown on FIG. 3.

During one revolution, the head 116 reads information from multiple tracks written on the disk and sends the signal to the data decoder 330. The data decoder calculates the number of tracks crossed and angular position of disk at any given moment, as shown by curve 340, where FP represents the point of maximum outwards eccentricity (FP). The line 345 shows the target track number after eccentricity is removed. Let M represent the maximum detected track number, N represent the minimum detected track number, and P is a track pitch. Then eccentricity $\epsilon$ is calculated as $$\epsilon = (M-N)*P/2.$$

In presence of servo information, radial position can be easily determined with resolution of a fraction of track pitch. In practice, the displacement $\epsilon$ is measured with accuracy of about 1% of track pitch.

The angular position $\alpha$ is determined by a spindle encoder 140 shown in FIG. 2. The encoder is rigidly coupled to the rotor of spindle assembly 104. The spindle encoder 140 produces two signals:

an index signal, which is one pulse per revolution,
an encoder signal, which determines the precise angular position of the disk in respect to the index.

Line 355 is a reference for the angular position measurements. It corresponds to the position of the disk at the moment when the spindle produces the index pulse.

Figure 4:
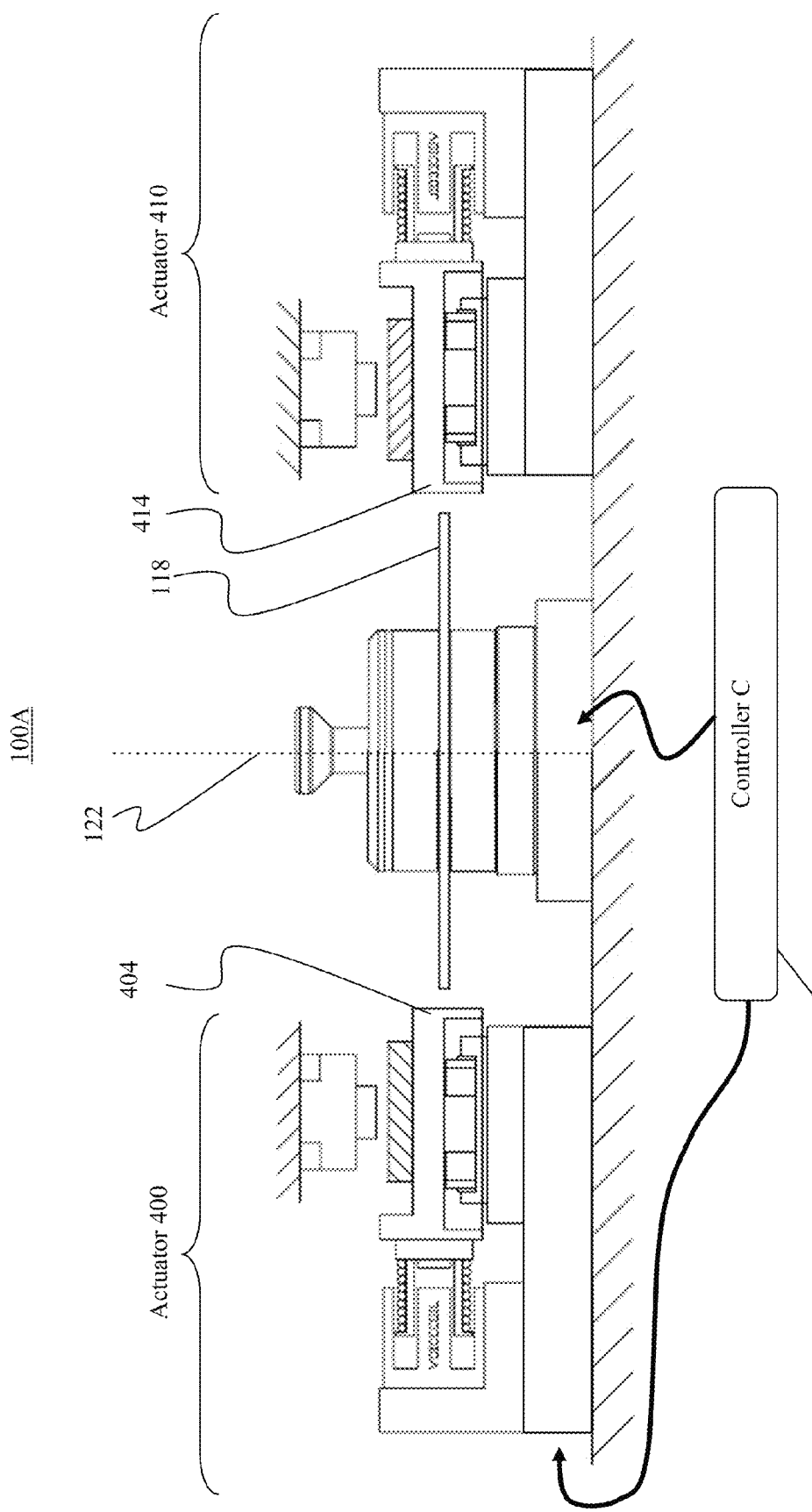
FIG. 4 is a schematic drawing of an embodiment of the invention with two actuators.

A preferred embodiment of a system with two actuators is shown in detail in FIG. 4. The system 100A includes a data track centering assembly, which is comprised of actuator 400 and actuator 410, positioned on opposite sides of a supported disk 118, and a controller 105 to control the functionality of the data track centering assembly. In various embodiments, that controller may be part of, and integral with, the controller of the spinstand of system 100A or it may be embodied in a controller distinct from the spinstand controller.

The actuator 400 and actuator 410 are generally similar and oppositely facing. Actuators 400 and 410 include a respective one of contact elements 404 and 414. Each contact element translates along a translation axis 460 through at least a portion of disk locus region. The translation axis is parallel to the plane of the disk 118 and intersects spin axis 122. Each contact element is adapted to selectively engage an edge of a disk 118 along the translation axis, as controlled by the controller.

The actuator 400 is selected to perform a disk translation function and actuator 410 is selected to perform a disk edge position detection and measurement function.

Figure 5:
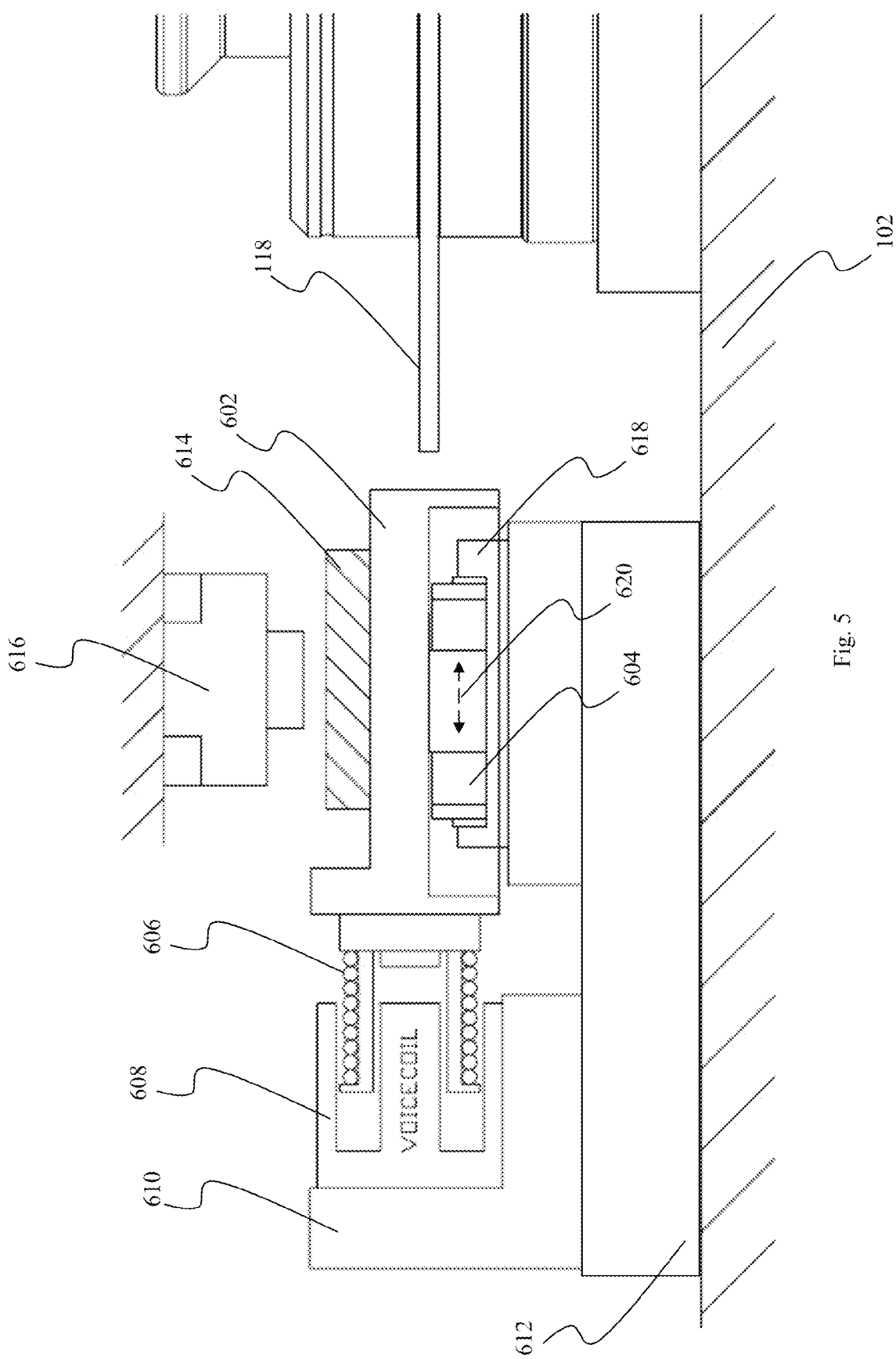
FIG. 5 is a schematic drawing of an embodiment of the actuator in detail.

The preferred embodiment of the actuators 400 and 410 is shown in more detail in FIG. 5. An actuator consists of a contact element 602 mounted on a carriage 604, a coil 606 of the linear motor rigidly attached to the contact element 602, a linear motor body 608 attached to the stationary bracket 610 mounted on a plate 612 attached to the base 102, a linear position encoder 614 attached to the contact element 602, and a linear position encoder reader 616 attached to the stationary base 102. The carriage 604 moves on a rail 618 in the direction along the translation axis, as indicated by the dashed arrow 620. The rail 618 is attached to the stationary plate 612 mounted on a base 102.

The position of the contact element with respect to the stationary base 102 is measured by a linear position encoder reader 616. The linear position encoder reader transmits signals indicative of the position of the contact element to the system controller. The system controller moves the contact element in a servo closed loop manner using the linear position encoder as a feedback.

The basic operation of the system 100A is described below in conjunction with FIGS. 6-9.

Figure 6:
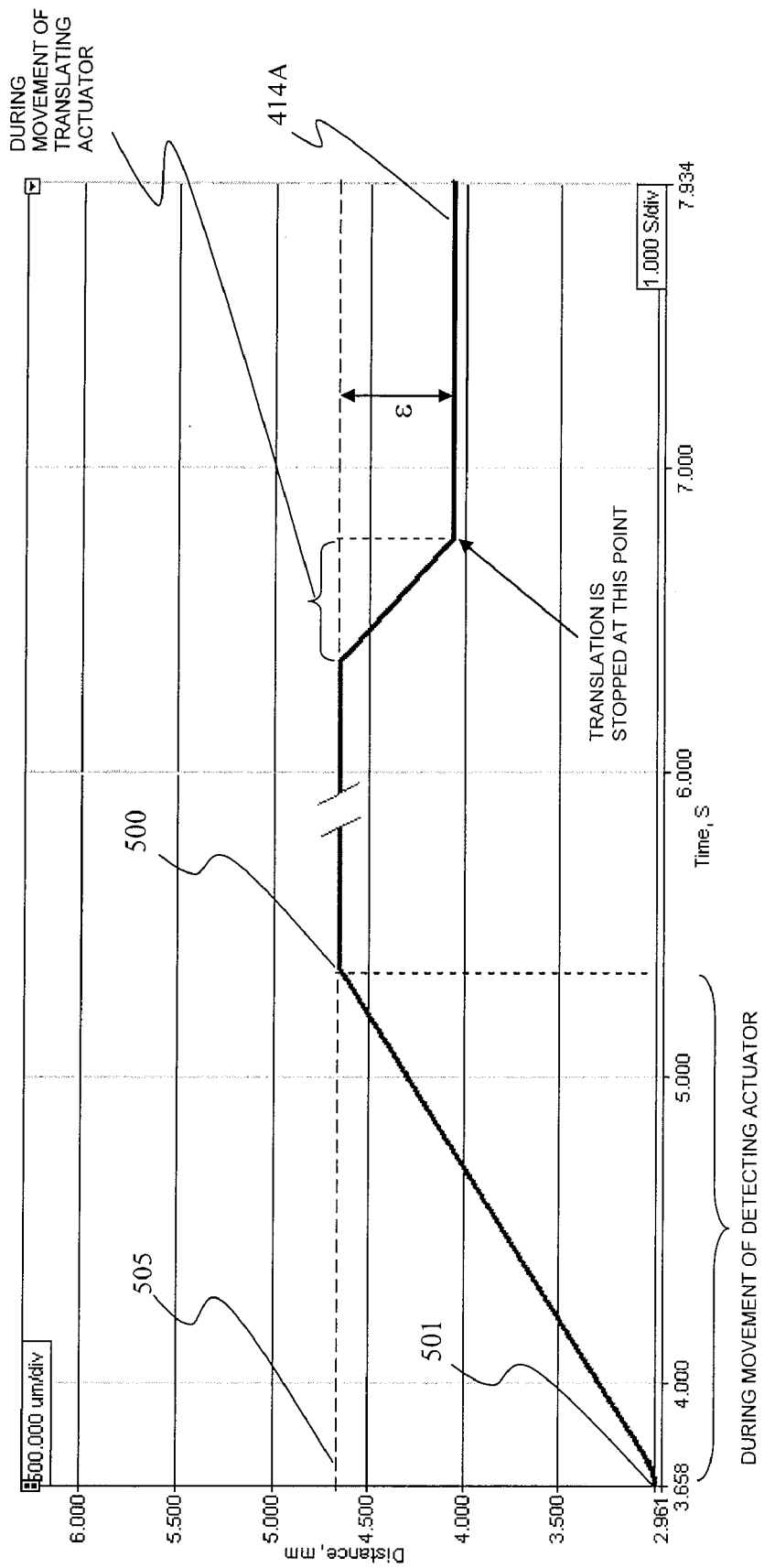
FIG. 6 is a diagram showing the position of the contact element of the "detecting" actuator as a function of time throughout the alignment process.

FIG. 6 shows the position of contact element 414 of the "detecting" actuator 410 as a function of time throughout the alignment process, starting at point 501.

A disk with data information is mounted and clamped to the spindle. The magnetic head is loaded onto the disk.

Figure 7:
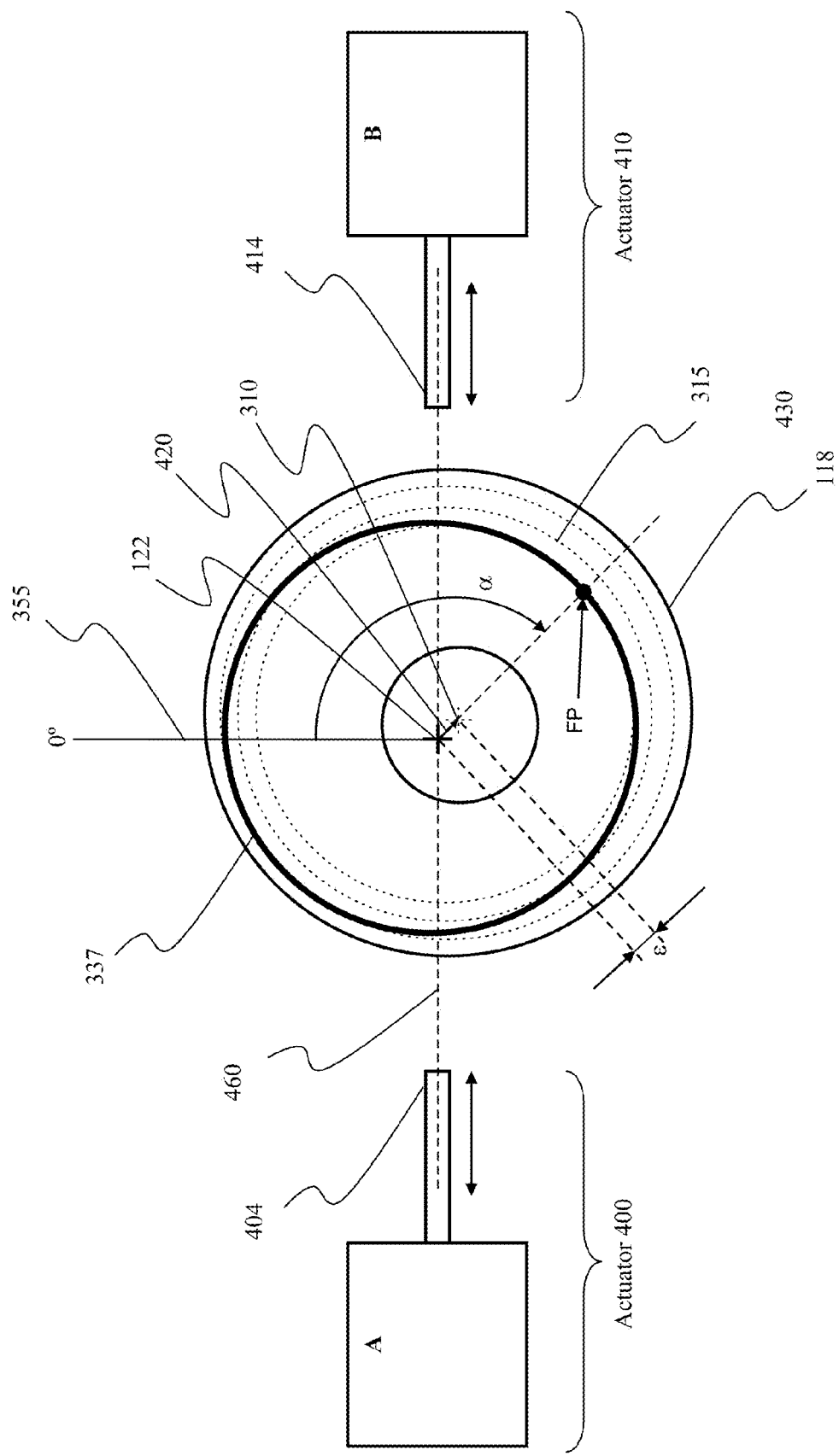
FIG. 7 is a schematic representation of the system of FIG. 2 with a disk prior to alignment.

As shown in FIG. 7, the band of data tracks 315 (dashed lines) on the disk 118 are concentric about a data axis 310. The data axis is offset by ϵ from the spin axis 122.

The controller reads information from the data tracks prewritten on the disk 118. The information is read along the trajectory 337 (solid line) concentric around the spin axis 122. Based on the information from the data tracks 315, the controller calculates the offset ϵ of the data axis 310 in respect to the spin axis 122.

The purpose of the method and system of the invention is to align the data axis 310 with the spin axis 122, such that the data tracks are concentric around the spin axis.

The offset between the data axis 310 and the spin axis 122 is expressed in a polar system of coordinates, which has the center at the spin axis position, and 0° angular reference line 355 designated by spindle index. The position of the data axis 310 in this coordinate system is a vector 420 characterized by length ϵ and angle α.

Figure 8:
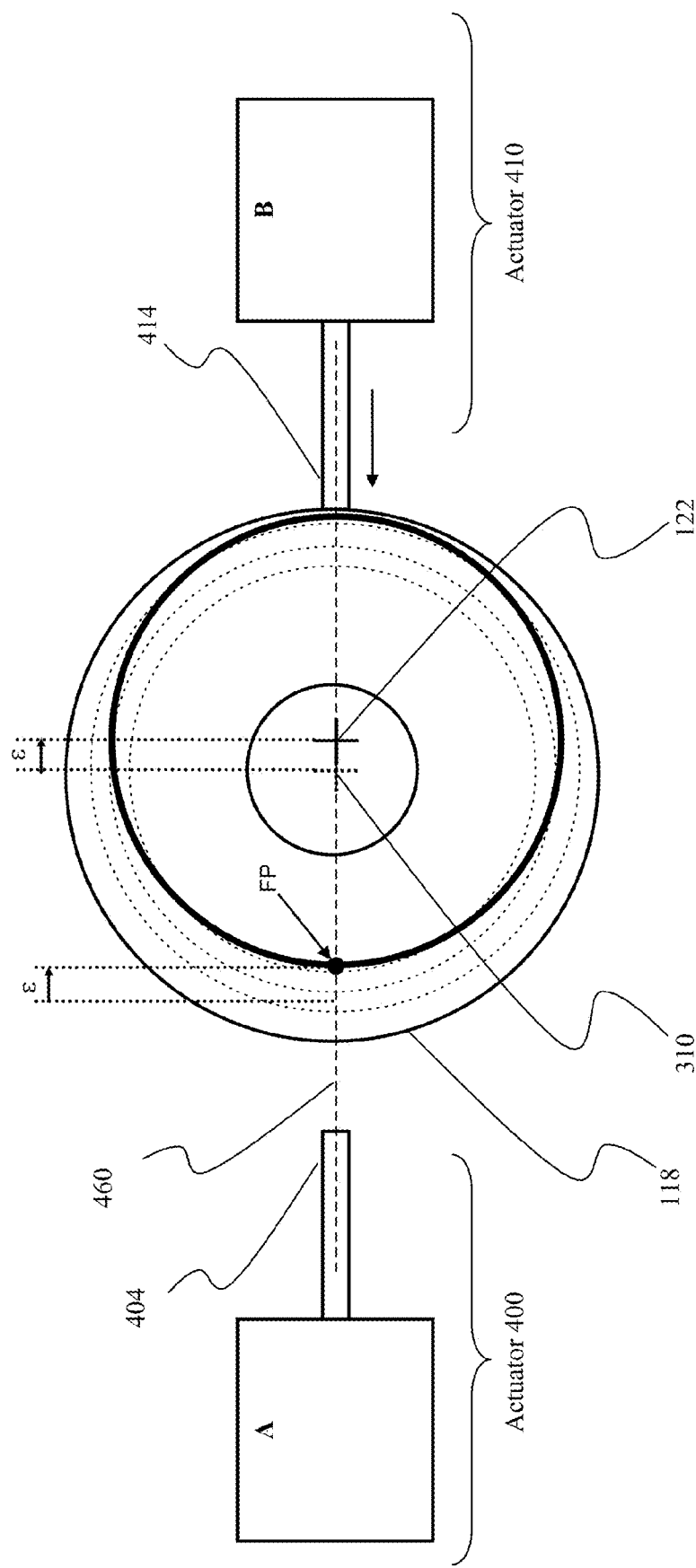
FIG. 8 is a schematic representation of the system of FIG. 2 with the disk rotated such that maximum outwards eccentricity is aligned with the translation axis of the disk alignment mechanism.

Once parameters ϵ and α are calculated based on the information read from the disk 118, the head is unloaded, the controller stops and locks the spindle at the angular position (translation position) as shown in FIG. 8, such that the data axis 310 moves to a location on the translation axis 460 between the spin axis 122 and the translating actuator 400. The disk 118 remains clamped to the spindle with a first clamp force FC1.

As shown on FIG. 8, the contact element 414 of the "detecting" actuator 410 is moved toward the edge of disk 118 at a relatively low speed to minimize impact when the contact element engages with the disk edge, such that the contact element does not cause a shift in position of the disk during edge position measurement. The advancement of the contact element 414 is stopped when it comes into the contact with the disk edge. When stopped, the position of the disk edge is determined by the linear position encoder at a point 500 shown on FIG. 6, where the linear position encoder reading stops changing and indicates the position 505 of the disk edge.

Then the clamp force on the disk 118 is changed to a smaller disk clamp force FC2.

Figure 9:
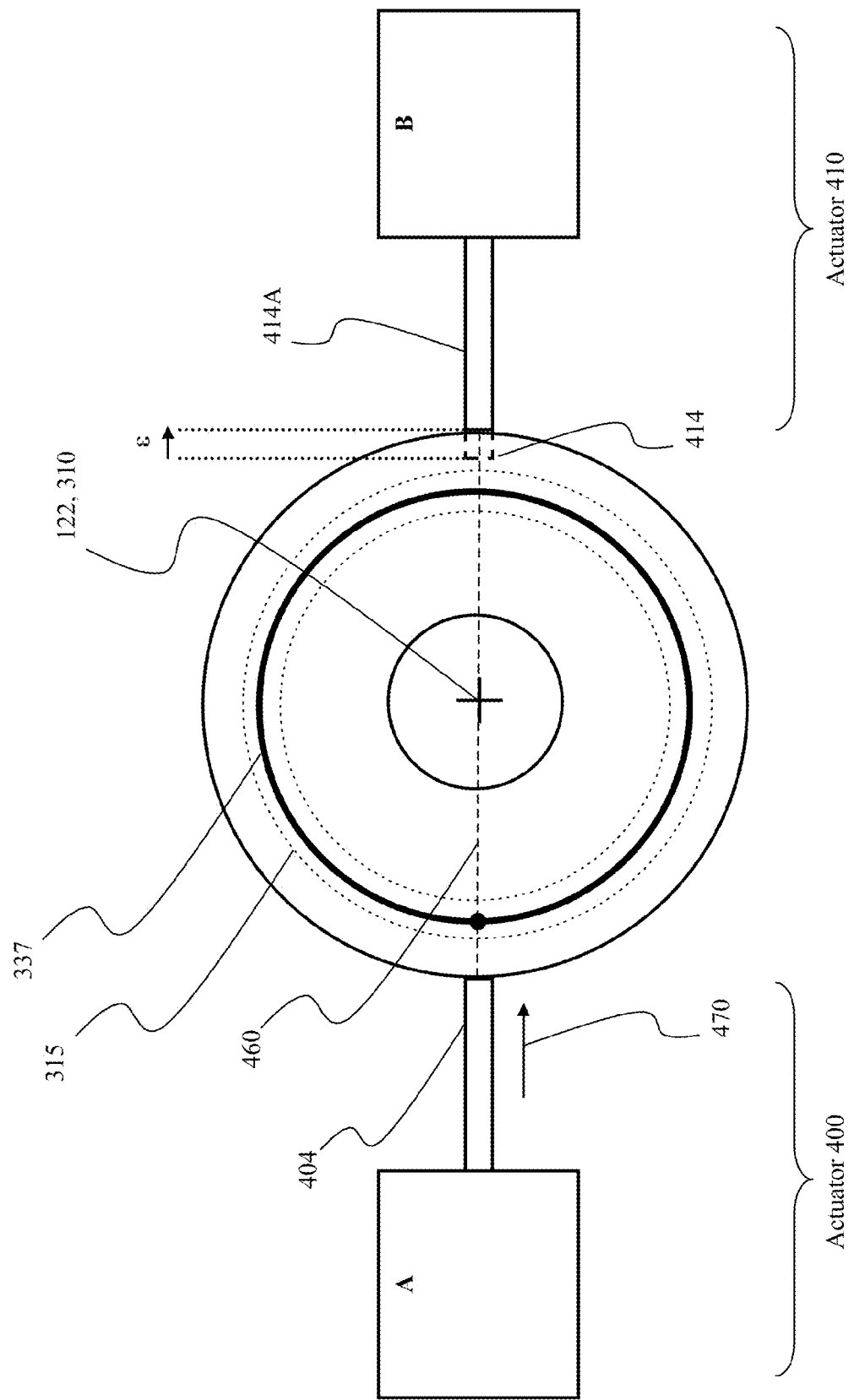
FIG. 9 is a schematic representation of the system of FIG. 2 with the disk after alignment.

Then the contact element 404 of the translating actuator 400 is moved along the translation axis 460 toward the edge of the disk as shown by arrow 470 on FIG. 9.

The controller moves the "translating" contact element 404 using the position feedback from both the linear position encoder attached to the "translating" contact element 404 and the linear position encoder attached to the "detecting" contact element 414. The closed loop parameters are selected such that it is desirable to move the contact element without overshoot. The controller stops moving the "translating" contact element 404 when it determines that the "detecting" contact element 414 is moved by the required distance ϵ to the position 414A as shown on FIG. 6 and FIG. 9.

The linear position encoder attached to the "detecting" contact element 414 reflects the disk position more accurately compared to the linear position encoder attached to the "translating" contact element 404, because the disk may be compressed by the "translating" contact element from the "translating" actuator side. The disk from the "detecting" actuator side is not compressed.

The translating actuator can apply force in two modes—in the first mode, the translating actuator applies force to the edge of the disk mainly to overcome friction between the disk and the clamping mechanism selected to disk clamp force FC2. In the second mode the translating actuator moves in the step movement to apply kinetic energy in a form of a predetermined impulse to move the disk; the contact element comes to contact with the disk for a relatively short period. By applying short impulses to the disk edge the actuator overcomes the stiction friction and the inertia of the disk itself to translate said disk, but does not cause deflection of the spindle rotor (the spindle rotor may deflect due to limited stiffness of the spindle motor bearing).

Then the clamp force on the disk 118 is changed back to the original disk clamp force FC1.

Thus, following the translation of the disk by ϵ, the data axis 310 and spin axis 122 coincide as shown on FIG. 9; the data tracks 315 are then substantially concentric in respect to the spin axis 122.

Then the actuator contact elements 404 and 414 are both moved away from the disk edges.

As a final step, the disk is driven to spin to a nominal rotational speed, the head is loaded on the disk, and the quality of disk centering is confirmed by reading data information from the disk. In the case the data information indicates that the eccentricity exceeds the prescribed threshold, the process is repeated iteratively.

Figure 10:
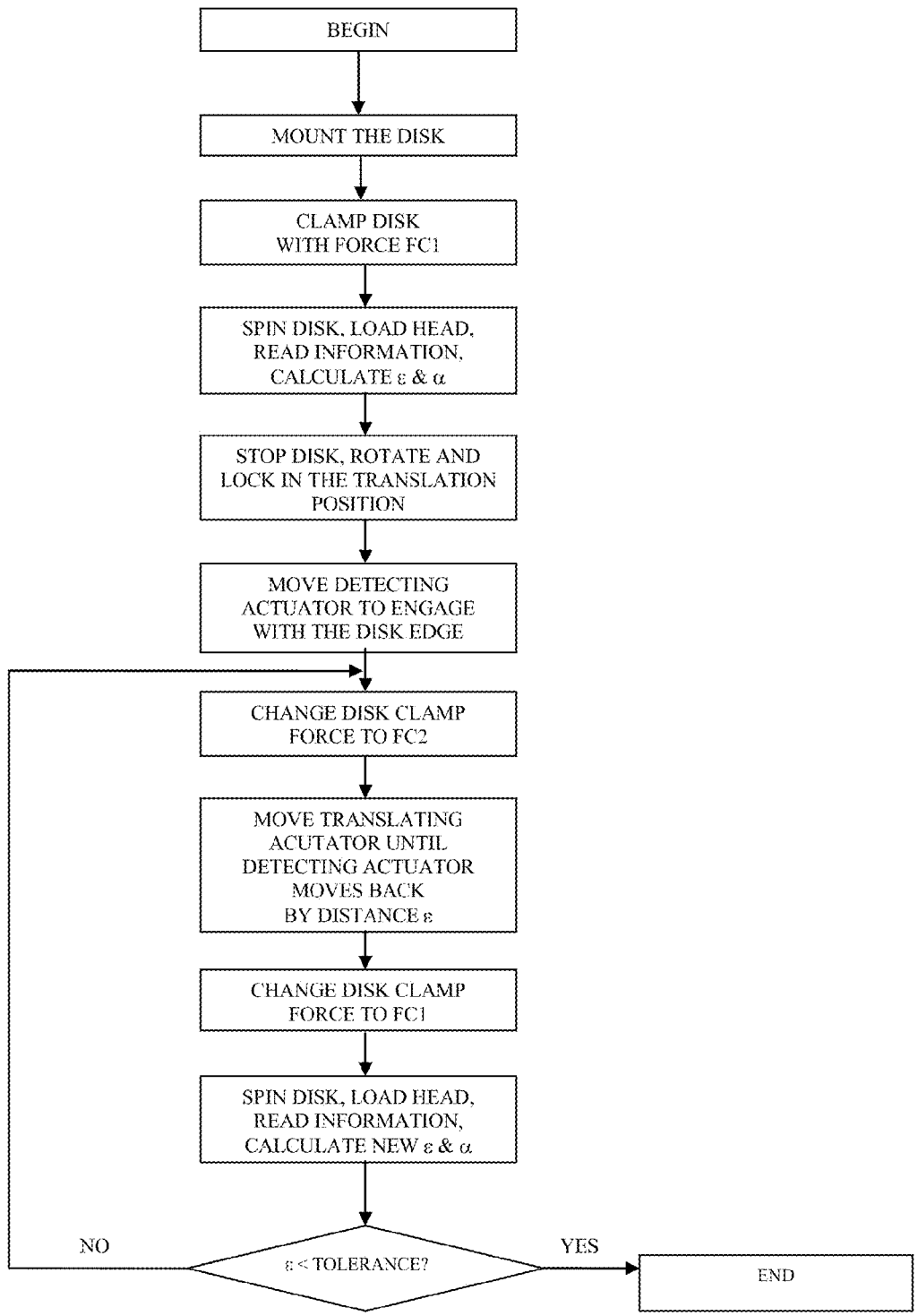
FIG. 10 is a block diagram of the disk centering algorithm for the system with two actuators.

The algorithm described above is illustrated on FIG. 10.

Figure 11:
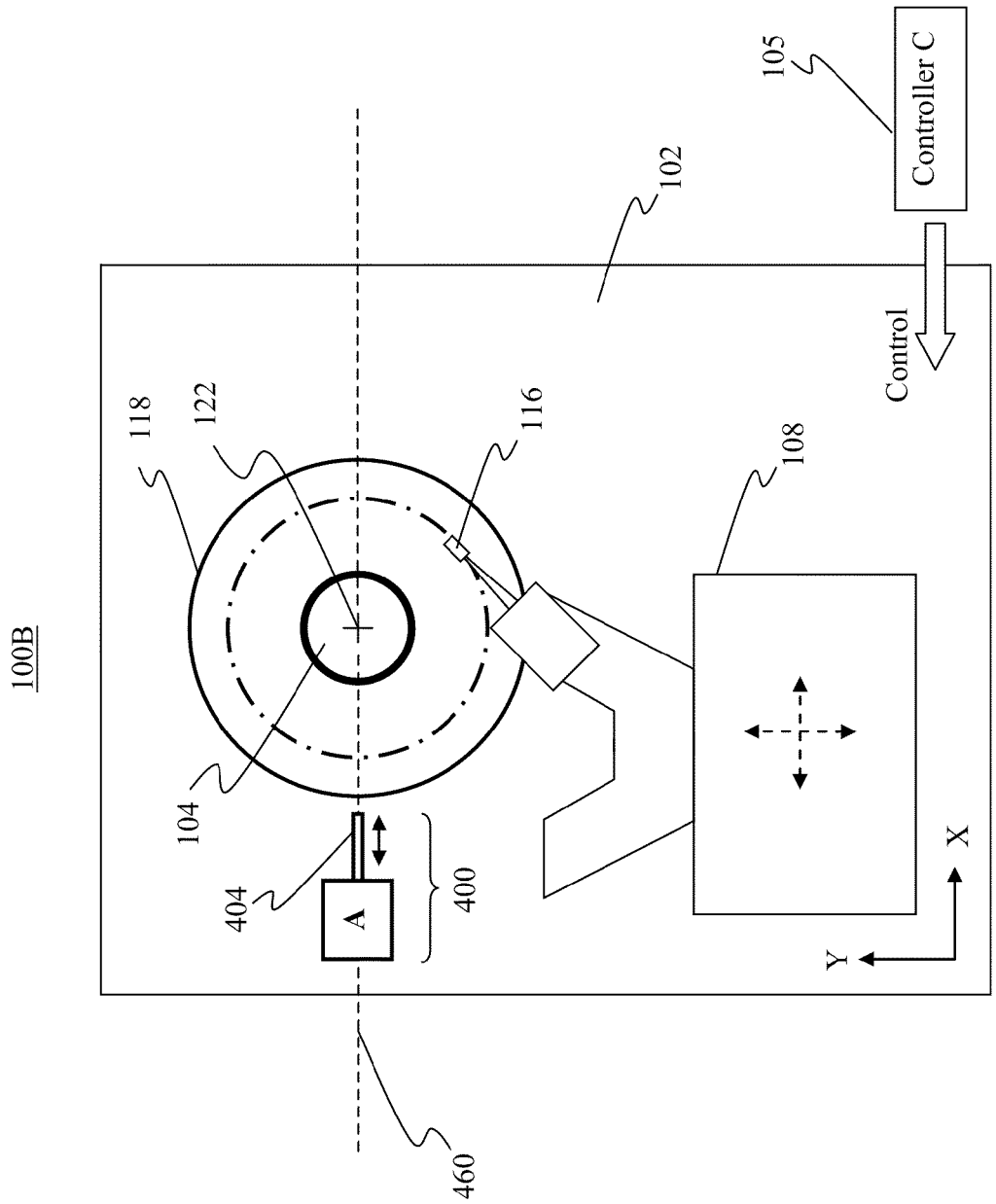
FIG. 11 is a top plan view schematic representation of a magnetic head and disk test system with a single actuator in accordance with the invention.

In an alternative form of invention, the data track centering assembly is principally comprised of a single actuator 400 disposed from one side of the disk as shown on FIG. 11. The actuator alternates its function between "translating" and "detecting" steps as described below.

The disk is mounted on the spindle and eccentricity is measured the same way as described above. The spindle is stopped and locked in the translation position.

Initially, the actuator performs the disk edge position detection, using the linear position encoder attached to the contact element 404.

Then the clamp force on the disk 118 is reduced to a smaller disk clamp force FC2.

Then the actuator performs translation of the disk by a distance ϵ in a servo closed loop manner using the same linear position encoder attached to the contact element. The closed loop parameters are selected such that it is desirable to move the contact element without overshoot.

Then the clamp force on the disk 118 is increased back to the nominal disk clamp force FC1.

Then the actuator repeats the disk edge detection step to ensure the disk is translated by a prescribed distance. In the case the disk edge position measured by the contact element 404 indicates that the disk was translated by the value less than ϵ (i.e. "underpushed"), the translation step is repeated. In the case the disk edge position measured by the actuator 400 indicates that the disk was translated by the value more than ϵ (i.e. "overpushed"), the controller rotates the spindle by 180 degrees, locks it in that position, and the process is repeated.

Then the contact element 404 is moved away from the disk edge.

As a final step, the disk 118 is driven to spin to a nominal rotational speed, the head 116 is loaded on disk 118, and the quality of disk centering is confirmed by reading data information from the disk. In the case the data information indicates that the eccentricity exceeds the prescribed threshold, the whole process is repeated iteratively.

Figure 12:
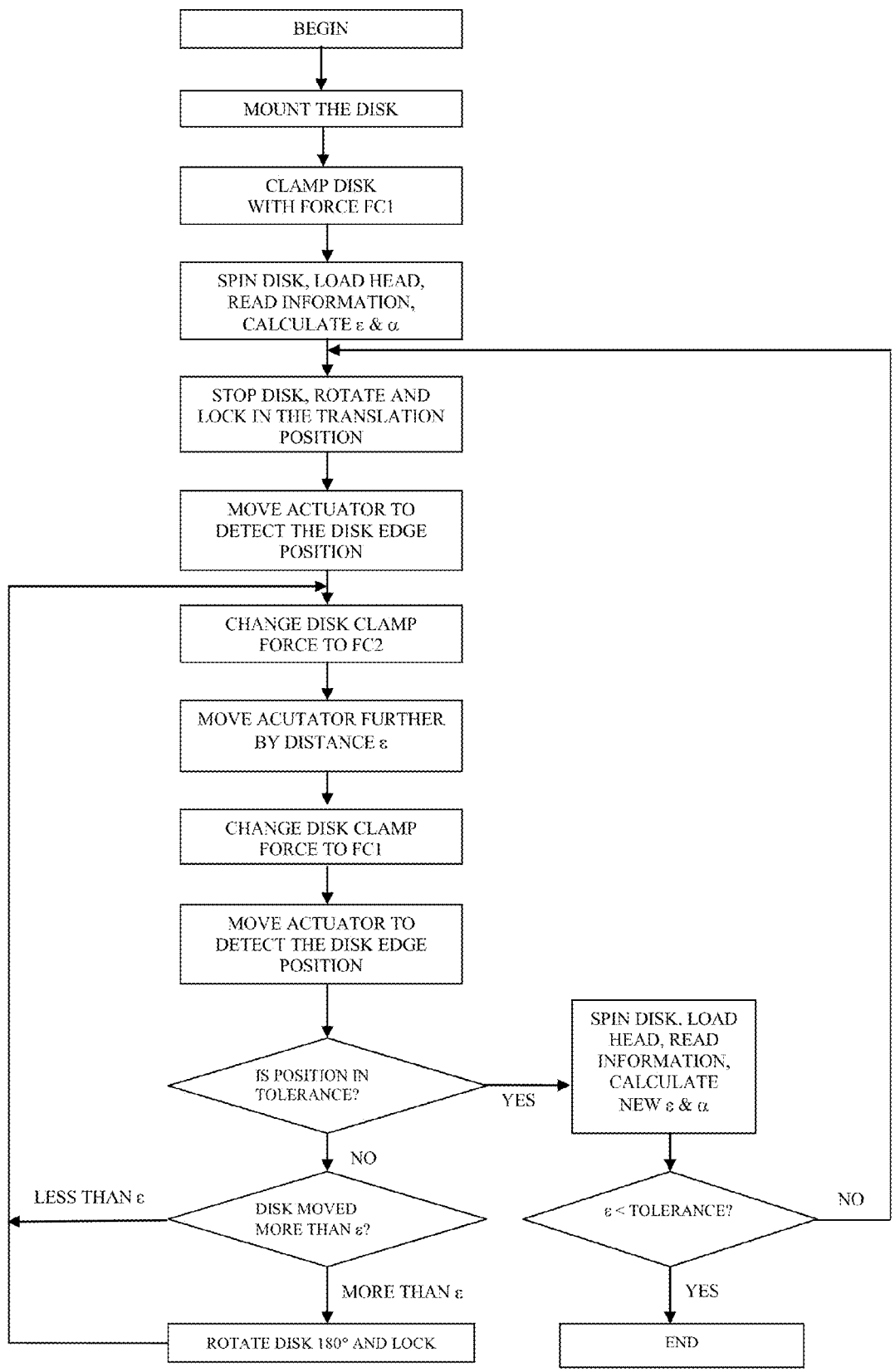
FIG. 12 is a block diagram of the disk centering algorithm for the system with a single actuator.

The algorithm described above is illustrated on FIG. 12.

Figure 13:
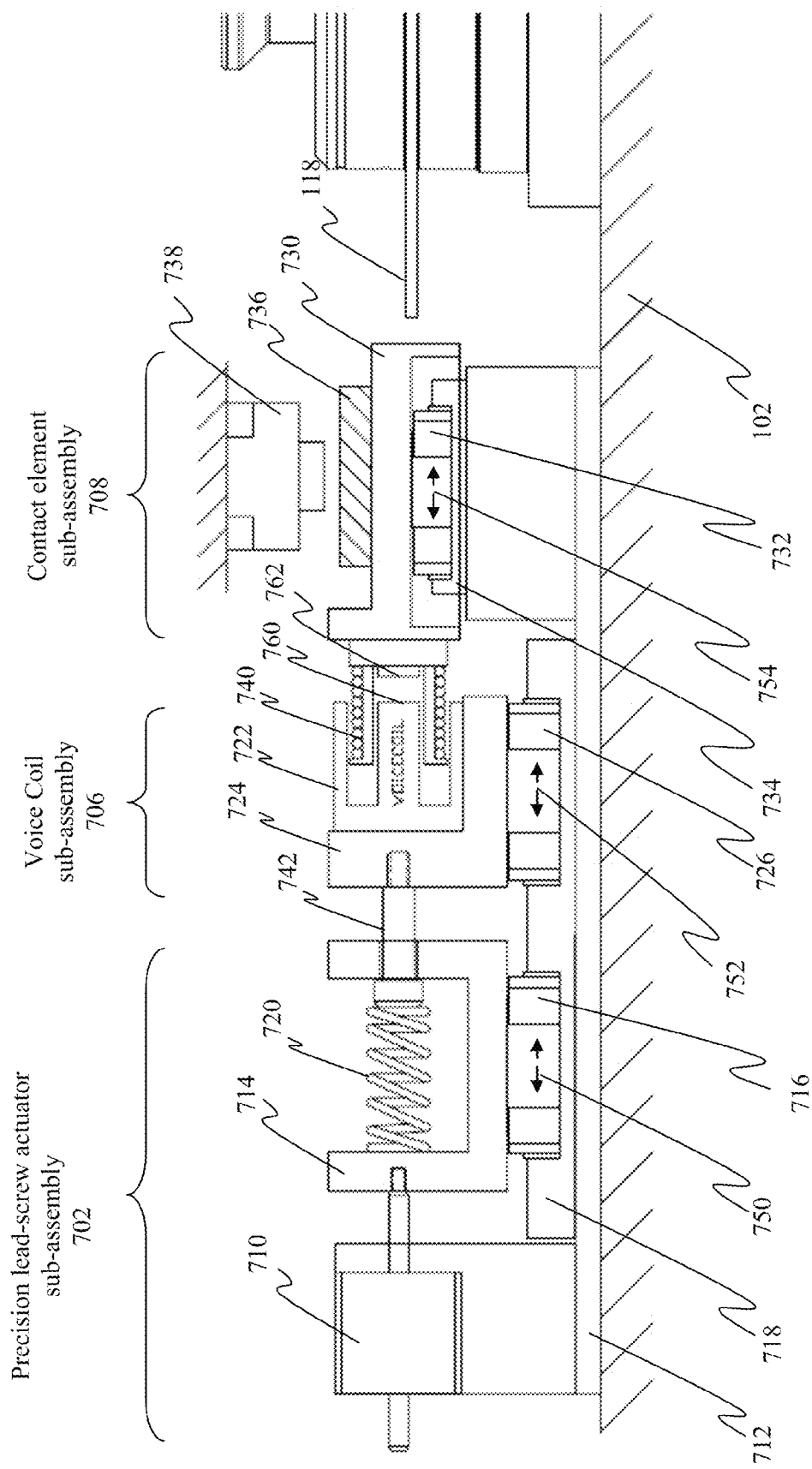
FIG. 13 is a schematic drawing of the alternative embodiment of the actuator with a voice-coil based coupling mechanism in detail, where voice coil is in the position for disk edge detection.

An alternative embodiment of the actuators 400B and 410B is shown in FIG. 13. An actuator consists of a precision lead-screw actuator sub-assembly 702, voice coil sub-assembly 706, and a contact element sub-assembly 708.

The contact element sub-assembly 708 consists of the contact element 730 mounted on a carriage 732, a linear position encoder 736 attached to the contact element, a linear position encoder reader 738 attached to the stationary base 102, and a voice coil 740. The carriage 732 moves on a rail 734 in the direction along the translation axis, as indicated by the dashed arrow 754. The rail 734 is attached to the stationary plate 712 mounted on a base 102.

The voice coil sub-assembly 706 consists of the voice coil motor body 722 attached to the bracket 724 mounted on a carriage 726, and a shoulder screw 742 attached to the bracket 724. The carriage 726 moves on a rail 718 in the direction along the translation axis, as indicated by the dashed arrow 752. The rail 718 is attached to the stationary plate 712 mounted on a base 102.

The precision lead-screw actuator sub-assembly 702 consists of a precision lead-screw actuator 710 rigidly mounted on a stationary plate 712 attached to the base 102, and a bracket 714 mounted on a carriage 716. The carriage 716 moves on a rail 718 in the direction along the translation axis, as indicated by the dashed arrow 750. The precision lead-screw actuator sub-assembly 702 also includes the force limiting spring 720, which applies the expansion force to the head of a shoulder screw 742, such that the head of said screw rests against bracket 714.

The actuator can be selected to perform one of two functions—disk edge position detection and disk translation.

To select the disk edge position detection function, the controller provides a command to the precision lead-screw actuator 710 to move all three carriages 716, 726, and 732 away from the disk edge, then the controller applies the command to the voice coil to move contact element 730 by a relatively short distance in the direction towards the disk edge, such that the voice coil surface 760 disengages from the hard stop 762. The linear position encoder 738 is used as a feedback for the coil.

Then the controller sends the command to the precision lead-screw actuator 710 to move the carriage 716 towards the disk edge until the contact element 730 engages with the disk edge and the position read by the linear position encoder reader 738 stops changing.

Figure 14:
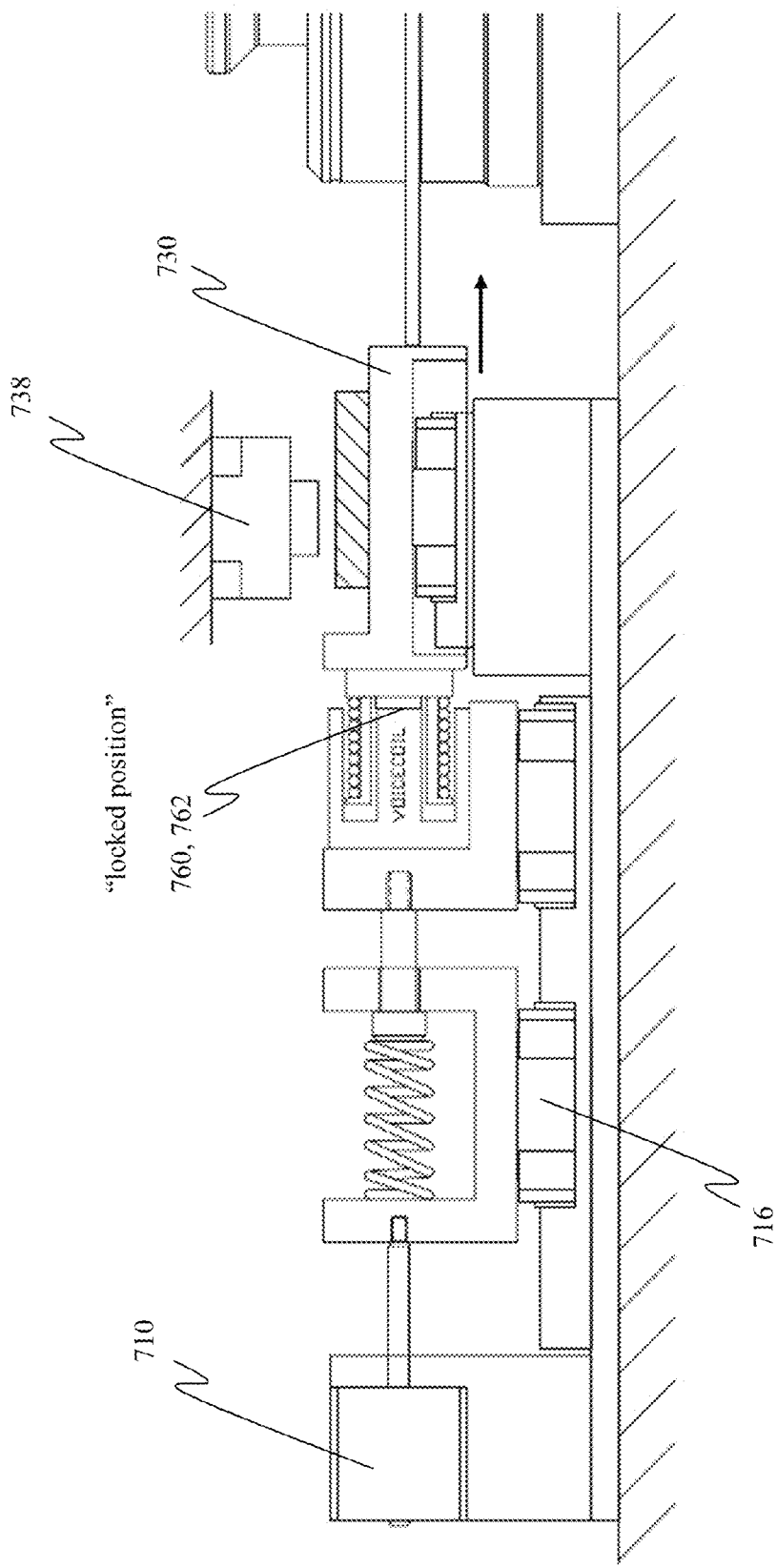
FIG. 14 is a schematic drawing of the alternative embodiment of the actuator with a voice-coil based coupling mechanism in detail, where voice coil is in the locked position for disk translation.

To select the disk translation function, the controller provides the reverse current to the voice coil 740, such that the voice coil stop surface 760 comes into contact with a hard stop 762, which brings the voice coil sub-assembly to a rigidly "locked" state as shown in FIG. 14.

Then the controller sends the command to the precision lead-screw actuator 710 to move the carriage 716 towards the disk edge until the contact element 730 translates the disk edge by the distance ϵ. If the data track centering assembly includes only one actuator 400B displaced from one side of the disk, the distance ϵ is measured by the linear position encoder reader 738 relative to the disk edge position measured by the same reader at the edge detection step. If the data track centering assembly includes two actuators displaced from the opposite sides of the disk, the detecting actuator 410B engages the contact element 730 with the disk edge, and then the distance ϵ is measured by the linear position encoder reader 738 installed on the detecting actuator 410B while the translating actuator 400B translates the disk.

Figure 15:
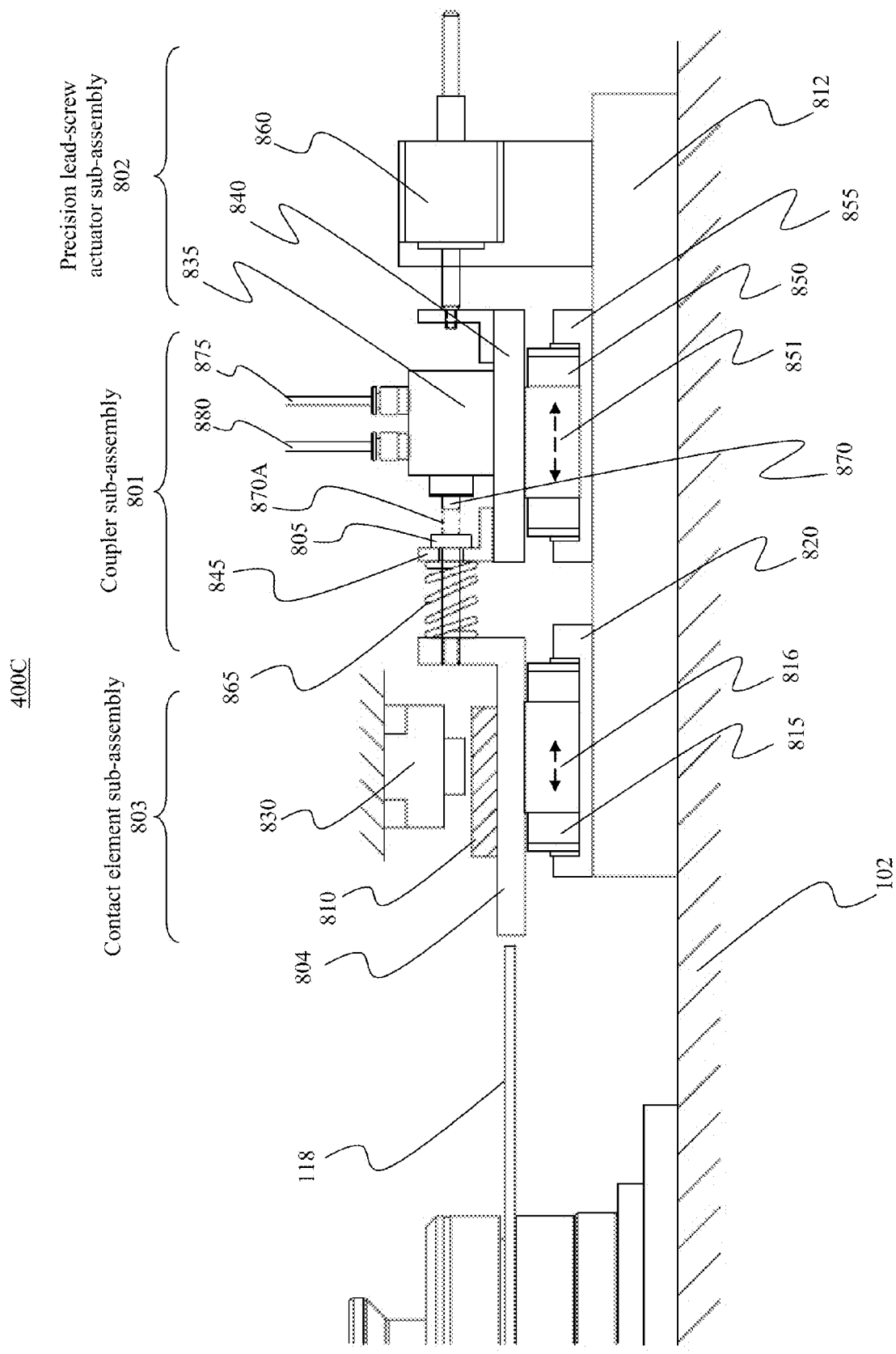
FIG. 15 is a schematic drawing of the alternative embodiment of the actuator with a spring coupling mechanism in detail.

An alternative embodiment of the actuator 400 is shown in FIG. 15. In that figure, actuator 400C is shown in detail, including a contact element sub-assembly 803, a coupler sub-assembly 801, and a precision lead-screw actuator sub-assembly 802.

The contact element sub-assembly 803 includes a contact element 804, a shoulder screw 805 attached to the contact element, a linear position encoder 810, and a carriage 815. The carriage 815 is mounted on a rail 820 attached to the stationary plate 812 mounted on the base 102. The contact element sub-assembly selectively (under control of controller) moves on the rail 820 towards the disk and back, as indicated by the dashed arrow 816.

The position of the contact element 804 with respect to the stationary base 102 is measured by a linear position sensor including a linear position encoder 810 and a stationary linear position encoder reader 830 mounted on the base 102.

The precision lead-screw actuator 860 is mounted on the stationary base 102 and moves the coupler sub-assembly 801 towards the disk 118 and back as indicated by the dashed arrow 851. The precision lead-screw actuator 860 is connected to the controller.

The coupler sub-assembly 801 includes a pneumatic actuator 835 mounted on an intermediate plate 840, a bracket 845, a carriage 850, and a compression spring 865. The intermediate plate 840 located on the carriage 850 moves on the rail 855, mounted on the stationary base 102.

The spring 865 applies a light expansion force between the contact element 804 and the bracket 845 mounted on the actuator intermediate plate 840, such that the shoulder screw head 805 rests against the bracket 845. The spring expansion force is greater than friction in the rail carriage 815.

The pneumatic actuator shaft 870 is retracted in the disk edge detection mode. The stiffness of the spring 865 is sufficient for the precision lead-screw actuator sub-assembly 802 to move the contact element sub-assembly 803 towards the disk without compressing the spring 865. Once the contact element 804 comes into mechanical contact with the edge of the disk 118, the spring 865 starts compressing, such that it lets the contact element sub-assembly 803 stop while the actuator 860 keeps moving the actuator sub-assembly 802. The disk edge is detected when the position reported by the encoder reader 830 stops changing. The controller sends the command to the actuator 860 to stop.

To switch to the disk translating mode, the pneumatic actuator shaft 870 is extended (shown by the dashed lines 870A in FIG. 15), pressing the shoulder screw head against the bracket 845. The air inlets 875 and 880 are used to toggle the pneumatic actuator shaft between the extended position 870A and the retracted position 870. The air supply pressure supplied to the pneumatic actuator is sufficient for the contact element 804 to translate the disk, but small enough to prevent disk damage.

In some embodiments, a solenoid or any other actuator can be used instead of a pneumatic actuator 835.

In some embodiments, the precision linear actuator 860 can be a piezoelectric motor, a stepper motor, a linear motor, or any other motor.

Figure 16:
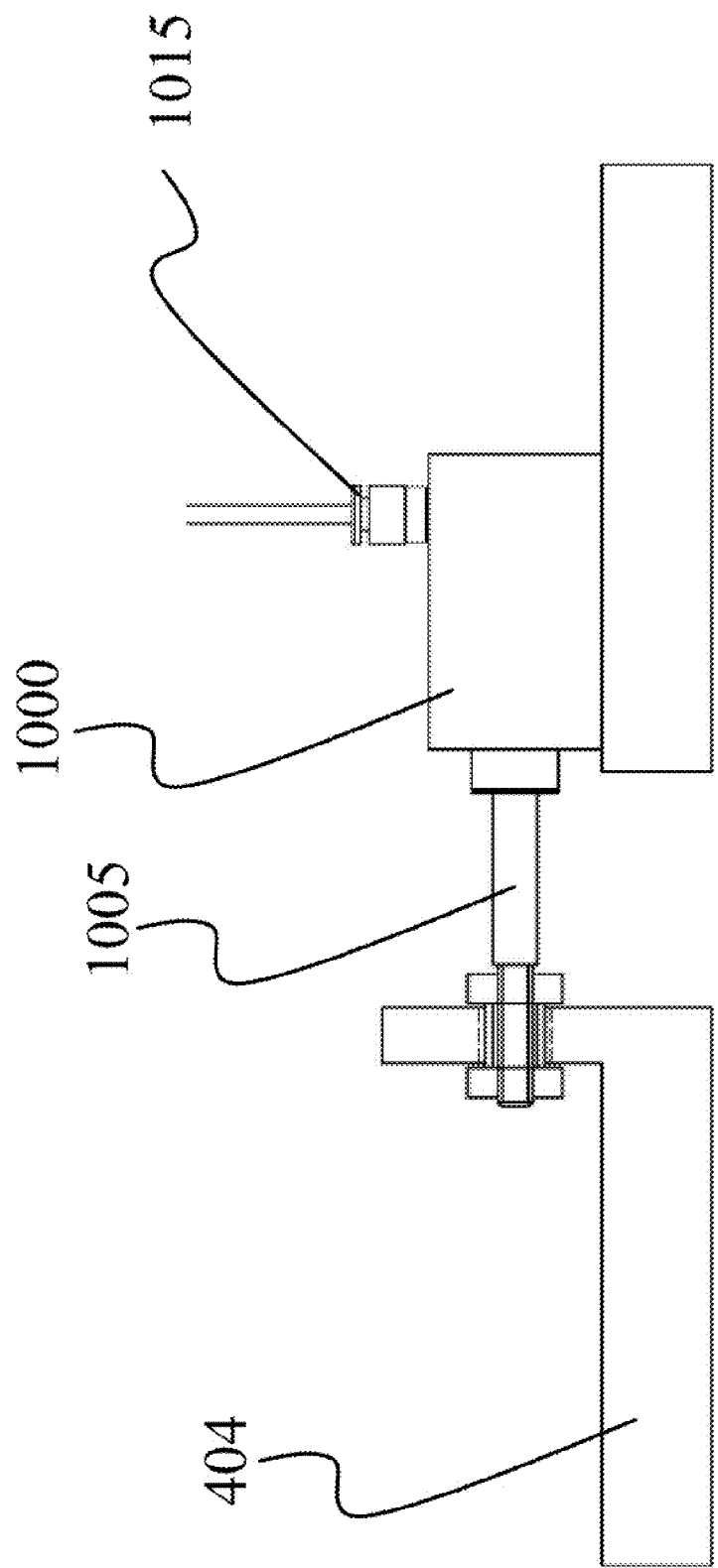
FIG. 16 is a schematic drawing of an exemplary coupling mechanism using a pneumatic actuator with variable pressure level.

In some embodiments, the coupling between the contact element sub-assembly and actuator sub-assembly can be done solely by means of a single pneumatic actuator 1000 as shown on FIG. 16. The shaft 1005 of the pneumatic actuator is rigidly coupled with the contact element sub-assembly 404. The air pressure is supplied through the inlet 1015. The air supply system switches between two levels of pressure—low pressure level of approximately 10 PSI for the disk edge detection step, and the high pressure level of approximately 100 PSI for the disk translation step.

Figure 17:
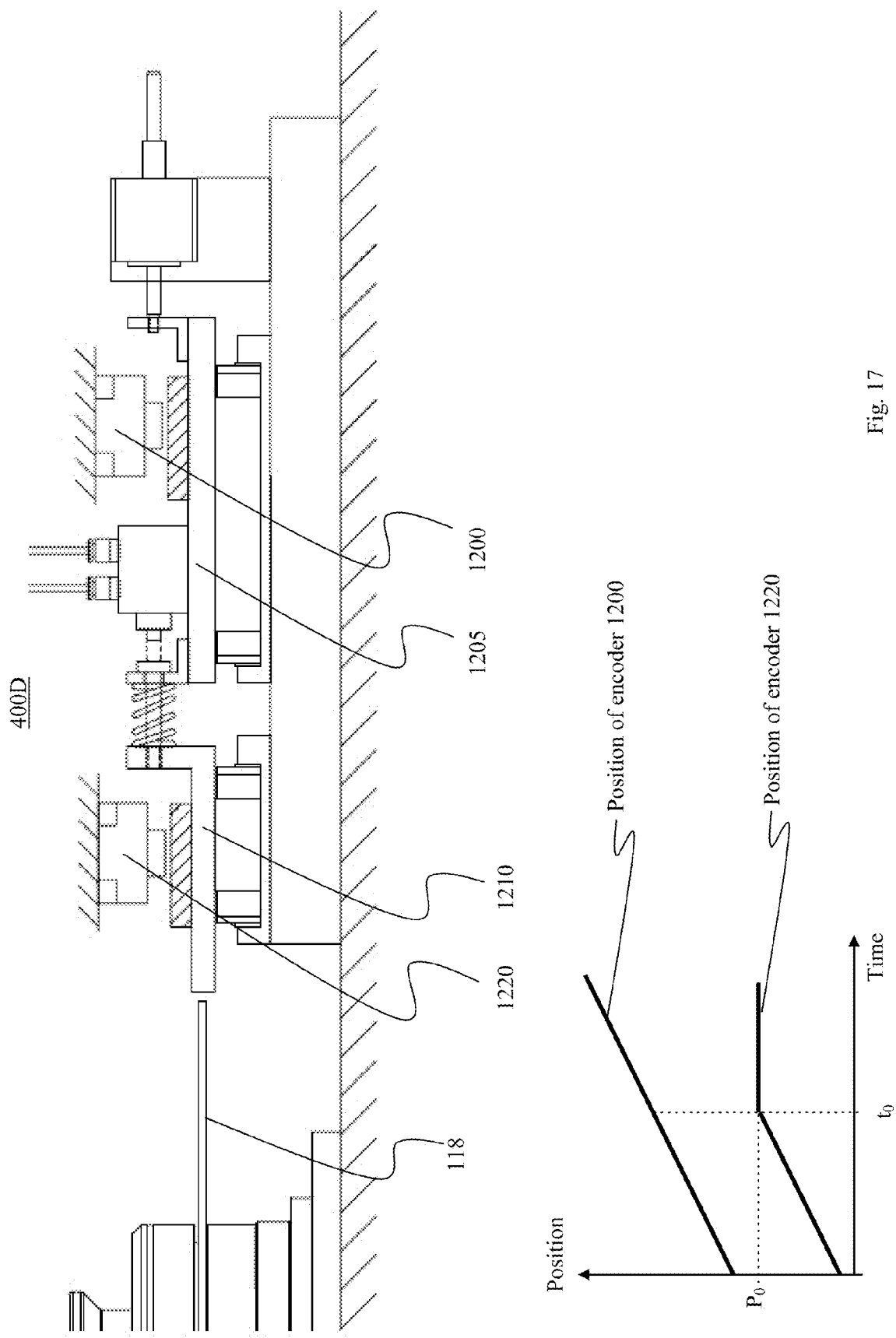
FIG. 17 is a schematic drawing of an exemplary actuator with two linear position encoders.

In some embodiments, a second linear position encoder 1200 can be attached to the actuator sub-assembly 1205 as shown on FIG. 17, such that the moment of time $t_0$ when the contact element 1210 comes into contact with the disk edge is determined when the delta between two linear position encoders starts changing (the delta between the contact element sub-assembly position encoder 1220 and the actuator sub-assembly position encoder 1200). Position of the disk edge is the reading $P_0$ of the linear position encoder reading 1220 captured at the moment of time $t_0$.

Figure 18:
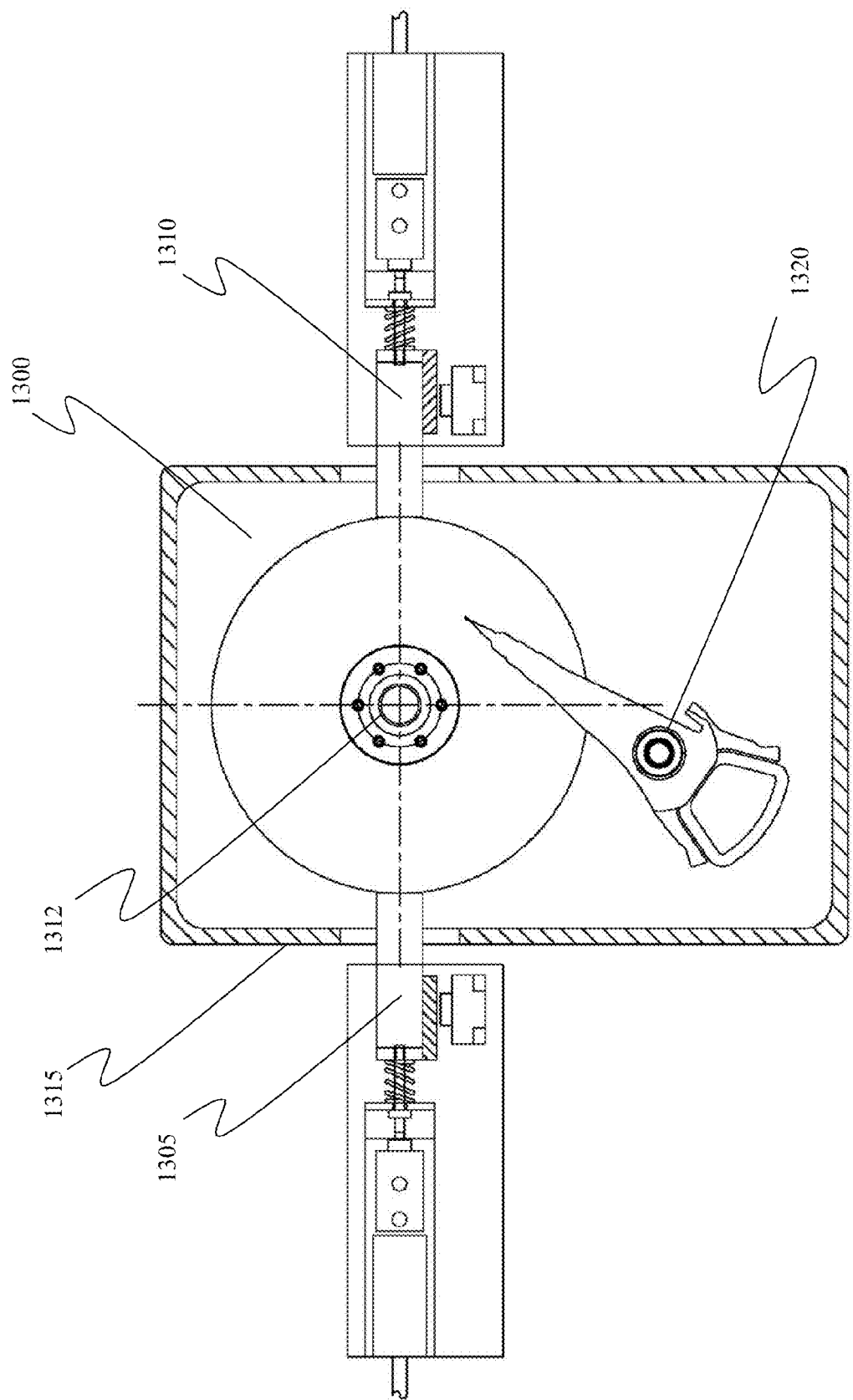
FIG. 18 is a schematic drawing of a disk alignment mechanism for disk centering in a disk drive.

In some embodiments, disk centering as discussed above may be performed in a disk drive having a disk spin assembly 1315, as shown in FIG. 18. For example, disk spin assembly includes a base 1300, a disk-support surface (not shown), a spindle 1312, a magnetic head assembly 1320, and a spindle controller (not shown). In this example, actuators 1305 and 1310 center the disk in respect to the spin axis of the spindle 1312 within a disk drive body 1315. In some embodiments, disk drive body 1315 and actuators 1305 and 1310 may be affixed to a mounting plate. In some embodiments, actuators 1305 and 1310 may be affixed to disk drive body 1315. In some embodiments, a rotary encoder may be employed in conjunction with a disk drive. Examples of such a rotary encoder include a detachable encoder attached to a disk clamping plate or hub, and marks etched or painted onto a disk clamping plate or hub. In some embodiments, a rotary encoder may operate in the same manner as described above for a spindle encoder. In some embodiments, rotational position may be detected optically, for example by analyzing a digital image showing a disk clamping plate or hub and determining a position based on a feature such as a screw, hole or mark.

In some embodiments, more than two actuators distributed along the circumferential edge of the disk can be used. For example, in the case of three actuators the actuators are located at positions with angular increment of 120 degrees; in the case of four actuators the actuators are located at positions with angular increment of 90 degrees; etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for aligning a data axis of one or more circular data-bearing tracks on an annular surface region of a magnetic media-bearing disk, with a spin axis of a spindle of a disk spin assembly, wherein said data axis is perpendicular to said surface region of said disk and said tracks are concentric with respect to said data axis, wherein said disk has a circumferential edge (CE), comprising the successive steps of:
  A. supporting said disk on a disk-support surface of said spindle,
  B. spinning said disk-support surface of said spindle together with said supported disk about said spin axis,
  C. detecting data on said tracks and in response to detected data identifying:
    a. a maximum eccentricity rotational angle $\alpha$ of orientation of said disk corresponding to a farthest point (FP) on said annular surface region of said disk representative of the relative position of a portion of a data track which is farthest from said spin axis compared to all other portions of said data track, and
    b. a distance $\epsilon$ between said spin axis and said data axis at said angle $\alpha$,
  D. rotating said spindle to an alignment position whereby said point FP is aligned with a translation axis extending perpendicular to and intersecting with said spin axis, and between said spin axis and a first portion of said CE along a translation axis, and
  E. at said alignment position, applying a translation force along said translation axis and toward said spin axis, to said first portion of said CE, whereby said disk is translated along said translation axis to reduce offset of said data axis with respect to said spin axis.

2. The method according to claim 1 comprising the further steps of:
  following step D,
    locking said spindle at said alignment position, and
  following step E,
    unlocking said spindle.

3. The method according to claim 1, comprising the further step of:
  following step D, and prior to step E,
  D1. at said alignment position, detecting the position of a second portion of said CE along said translation axis, and
  wherein said applying step E effects an application of said translation force to said first portion of said CE pursuant to a determination of the position of said first portion based on said detected position of said second portion of said CE.

4. The method according to claim 3, comprising the further steps of:
  following step E,
    F. repeating step D1, and
      a. in the event the detected position of CE indicates that the disk translation of step E is substantially equal to $\epsilon$, determining that translation is complete, and
      b. in the event the detected position of CE indicates that the disk displacement is not substantially equal to $\epsilon$, repeating steps E and D1.

5. The method according to claim 3, wherein:
a. during step D1, applying a clamping force FC1 to clamp said disk to said disk-support surface, and
b. during step E, applying a clamping force FC2 to clamp said disk to said disk-support surface, wherein FC2 is different from FC1.

6. The method according to claim 3, wherein said first portion of said CE is disposed along said translation axis on a first side of said disk, and said second portion of said CE is disposed along said translation axis on a second side of said disk, said second side being opposite said first side.

7. The method according to claim 3, wherein said first portion of said CE is the same as the second portion of said CE.

8. The method according to claim 1, wherein said first portion of said CE includes plurality of areas along the circumference of the disk.

9. The method according to claim 3, wherein said second portion of said CE includes plurality of areas along the circumference of the disk.

10. The method according to claim 1, comprising the further steps of:
following step E,
F. rotating said spindle, and during said rotation, repeating step C, and
a. in the event $\epsilon$ is below a predetermined threshold, determining that alignment of said data axis and said spin axis is complete, and
b. in the event $\epsilon$ is above said predetermined threshold, repeating steps D-E.

11. The method according to claim 1 wherein translation force is applied as a succession of pulses.

12. The method according to claim 1 wherein said data is servo data.

13. A system for aligning a data axis of two or more circular data-bearing tracks on an annular surface region of a magnetic media-bearing disk, with a spin axis of a spindle of a disk spin assembly, wherein said data axis is perpendicular to said surface region of said disk and said tracks are concentric with respect to said data axis, comprising:
A. a disk spin assembly including:
(i) a base,
(ii) a spindle adapted for rotational motion with respect to said base about a spin axis, and having a disk-support surface for supporting a magnetic media-bearing disk, whereby said data axis is parallel to said spin axis, and whereby said tracks of a supported disk are rotatable about said spin axis,
(iii) a magnetic head and associated head loading assembly adapted to selectively position said head over said tracks of a supported magnetic media-bearing disk, and
(iv) a spindle controller for selectively rotating said spindle about said spin axis,
B. a data track centering assembly including
a first actuator having a contact element and adopted for selectively translating said contact element through at least a portion of said disk locus region in a first direction along a translation axis, said translation axis intersecting with and being perpendicular to said spin axis,
C. a system controller operative to successively:
(i) rotate said spindle about said spin axis,
(ii) with said magnetic head, detect data on said tracks of said disk on said disk-support surface and identify (a) a rotational angle $\alpha$ of orientation of said disk when said head overlies a portion of a data track which is farthest from said spin axis compared to all other portions of said data track, and (b) a distance $\epsilon$ between said spin axis and said data axis at said angle $\alpha$,
(iii) rotate said spindle until said farthest portion of said track is aligned with said translation axis, and
(iv) activate said first actuator to engage said contact element with said disk, whereby said disk is translated along said translation axis to reduce offset of said data axis with respect to said spin axis.

14. The system of claim 13 wherein said system controller is operative to repeat steps C(ii)-C(iv) iteratively until distance $\epsilon$ between said spin axis and said data axis is below predetermined threshold.

15. The system of claim 13 wherein said controller is operative pursuant step C(iv) to activate said first actuator to apply a succession of force pulses, wherein each pulse transfers kinetic energy of contact element to said disk, whereby said disk is translated along said translation axis to reduce offset of said data axis with respect to said spin axis.

16. The system of claim 13 wherein said first actuator is selectively operative in two modes:
A. a disk edge position detection mode providing force F1 insufficient to overcome friction between a disk and said disk-support surface,
B. a disk translation mode with a providing force F2 sufficient to overcome friction between a disk and said disk-support surface.

17. The system of claim 16 wherein said disk spin assembly further includes
a clamp assembly for selectively clamping a magnetic media-bearing disk to said disk-support surface with a clamp force, said clamp force being selected from force value FC1 and force value FC2,
wherein said system controller is further operative pursuant to step 16(A) to control said clamp assembly to clamp said disk to said surface with said first force value FC1, and
wherein said system controller is further operative pursuant to step 16(B) to control said clamp assembly to clamp said disk to said surface with said second force value FC2.

18. The system of claim 17 wherein FC1 is different from FC2.

19. The system of claim 17 wherein FC2 is equal to FC1.

20. The system of claim 13 wherein said data track centering assembly includes:
i. said first actuator, and
ii. a position sensor for detecting the position of said disk along said translation axis,
wherein said system controller is operative pursuant to step C(iv) to activate said first actuator at least partially in response to a detected position of said disk along said translation axis as determined by said position sensor.

21. The system of claim 20 wherein said disk edge sensor is disposed adjacent to said first side of said disk locus region.

22. The system of claim 20 wherein said disk edge sensor is disposed adjacent to a second side of said disk locus region, said second side being opposite said first side.

23. The system of claim 13 wherein said data track centering assembly includes a second actuator having a contact element and adapted for selectively translating said contact element of said second actuator to engage with the edge of said disk and to translate said disk in a second direction along said translation axis, said translation axis intersecting with and being perpendicular to said spin axis, wherein said first actuator and said second actuator are disposed on opposite sides of said disk locus region, and said first direction and said second direction are oppositely directed.

24. The system of claim 23 wherein said system controller is operative prior to activating said first actuator pursuant to step C(iv) for positioning said contact element of said second actuator to engage with the edge of said disk, wherein said contact element of said second actuator measures the position of said edge.

25. The system of claim 23 wherein said first actuator is selectively operative to detect an edge of said disk in on said disk-support surface, and said second actuator is selectively operative to apply a force to an edge of said disk.

26. The system of claim 23 wherein said first actuator and said second actuator are alternatively operative to detect an edge of said disk on said disk-support surface, and to apply a force to an edge of said disk.

27. The system of claim 13 wherein a data track centering assembly includes a single actuator assembly, wherein said actuator is alternatively operative to detect an edge of said disk on said disk-support surface, and to apply a force to an edge of said disk.

28. The system according to claim 13, wherein a data track centering assembly includes a plurality of actuator assemblies distributed along the circumference of said disk locus region.

29. The system of claim 16 wherein said actuator includes an intermediate coupler assembly coupling said actuator with said contact element, wherein said coupler assembly has selectable coupling force; and said system controller is operative to select coupling force F1 during step 16(A) and coupling force F2 during step 16(B), wherein force F1 is different from force F2.

30. The system of claim 13 wherein said spindle controller includes operation mode for locking said spindle in a prescribed angular position.

31. The system of claim 13 further including a locking assembly for locking said spindle in a prescribed angular position.

32. The system of claim 13 wherein said data is servo data.

33. The system of claim 13 wherein said disk spin assembly is a component of a disk drive.

34. The system of claim 13 wherein said disk spin assembly is a component of a spinstand.

\* \* \* \* \*